United States Patent [19]

Arnold

[11] Patent Number: 5,791,442
[45] Date of Patent: *Aug. 11, 1998

[54] MAGNETIC LATCH MECHANISM AND METHOD PARTICULARLY FOR LINEAR AND ROTATABLE BRAKES

[75] Inventor: James Harold Arnold, Moberly, Mo.

[73] Assignee: Orscheln Management Co., Moberly, Mo.

[ * ] Notice: The term of this patent shall not extend beyond the expiration date of Pat. No. 5,443,132.

[21] Appl. No.: 762,557

[22] Filed: Dec. 9, 1996

Related U.S. Application Data

[63] Continuation-in-part of Ser. No. 517,300, Aug. 21, 1995, Pat. No. 5,582,275, which is a continuation-in-part of Ser. No. 248,258, May 25, 1994, Pat. No. 5,443,132.

[51] Int. Cl.$^6$ .................................................. B60T 7/12
[52] U.S. Cl. ........................ 188/138; 188/156; 188/161; 188/164; 303/20
[58] Field of Search ........................ 188/138, 156, 188/163, 161, 165, 164, 106 A, 78, 325, 166, 171, 112 R; 335/209, 219, 266, 281; 310/77; 303/20, 7, 121, 123, 124, 155

[56] References Cited

U.S. PATENT DOCUMENTS 5,443,132   8/1995   Arnold ........................... 188/138
5,582,275  12/1996   Arnold ........................... 188/138

*Primary Examiner*—Douglas C. Butler
*Attorney, Agent, or Firm*—D. D. McGraw; Douglas E. Sittler

[57] ABSTRACT

Latching mono-stable brakes which are held disengaged from braking surfaces by the energization of electromagnets, and are engaged with the braking surfaces by deenergization of the electromagnets and the magnetic forces of permanent magnets. The brakes are particularly applicable to linear braking in such vehicles as elevators, trains, trams, cable cars and the like. They may also be applicable to vehicle brakes which act on rotating braking surfaces. They may be actuated in response to excessive speed, particularly when installed in vehicles such as elevators. They may be unlatched as needed by reenergization of the electromagnets. Various features of such brake mechanisms are disclosed, including guided mountings; scissors-like mountings; combined mechanical servo and magnetic actions; multi-brake equalization mechanism; pivotally mounted actuation and release brake units; braking action on rails, rods, cables, and the like; details of magnetic pole piece construction to accommodate various braking surfaces being engaged; elliptically shaped electromagnet windings having different numbers of layers of windings on diametrically opposite sides; magnetic flux concentrators/dispersers formed on the ends of magnet pole pieces; and other features.

33 Claims, 12 Drawing Sheets

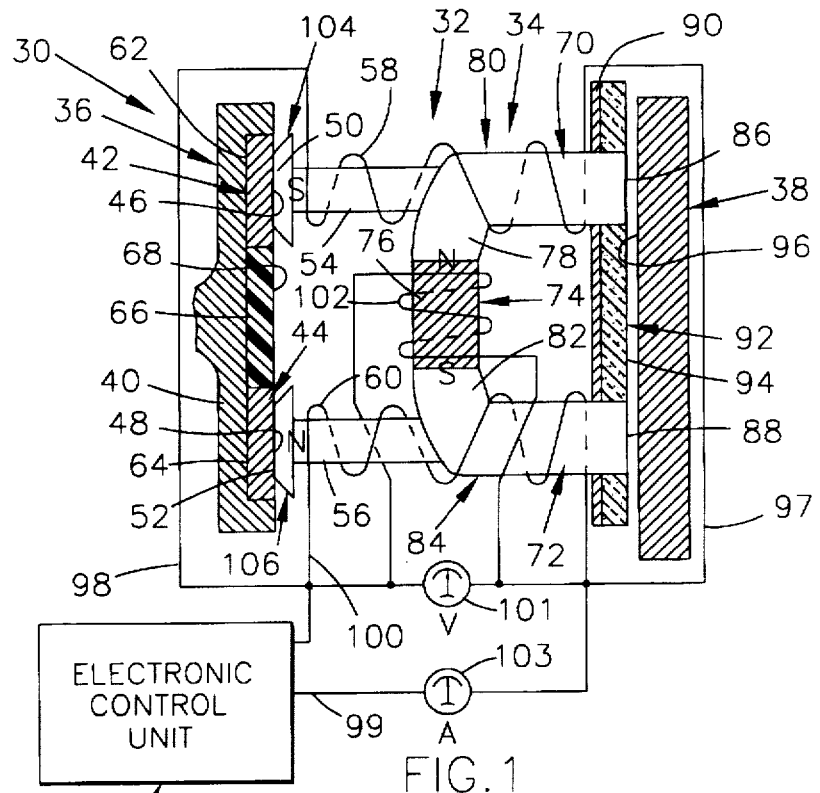

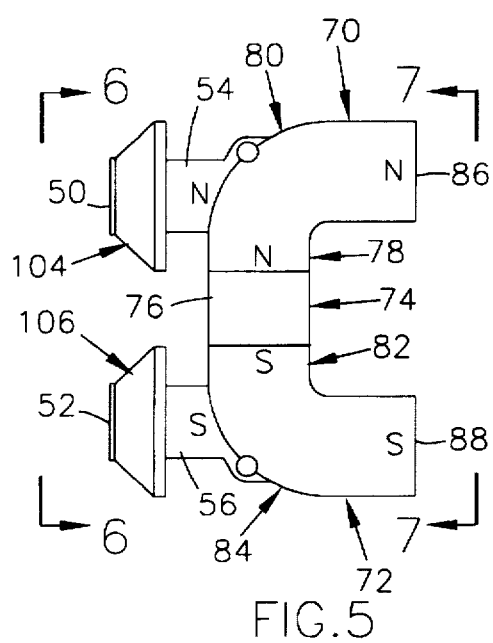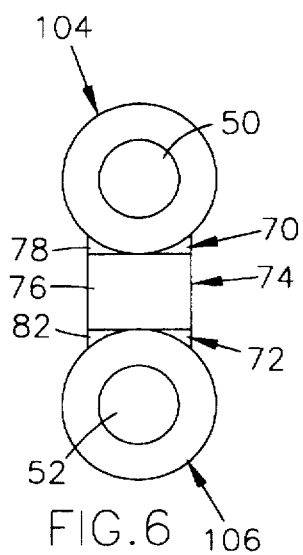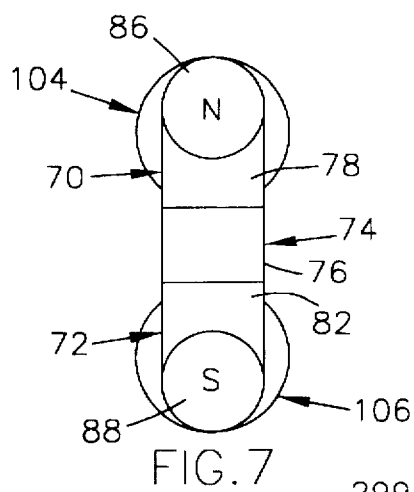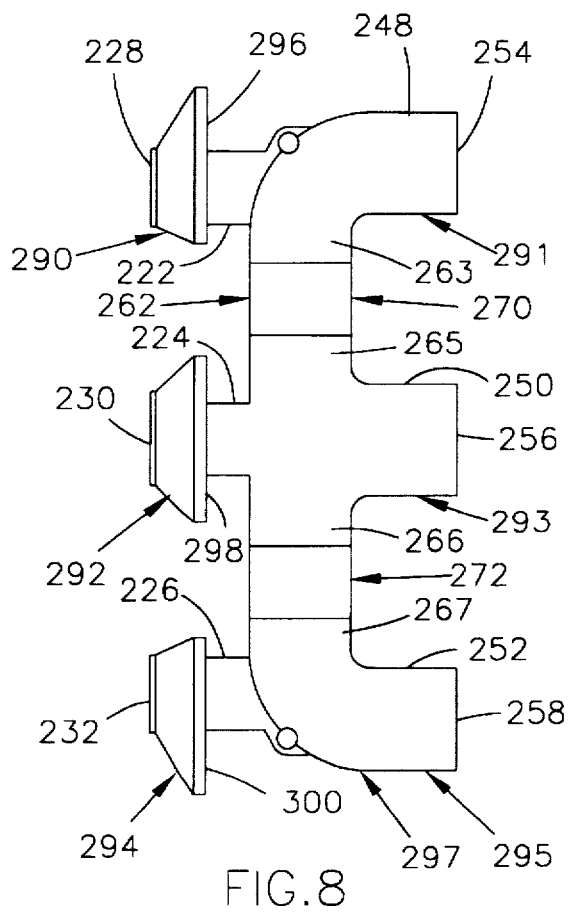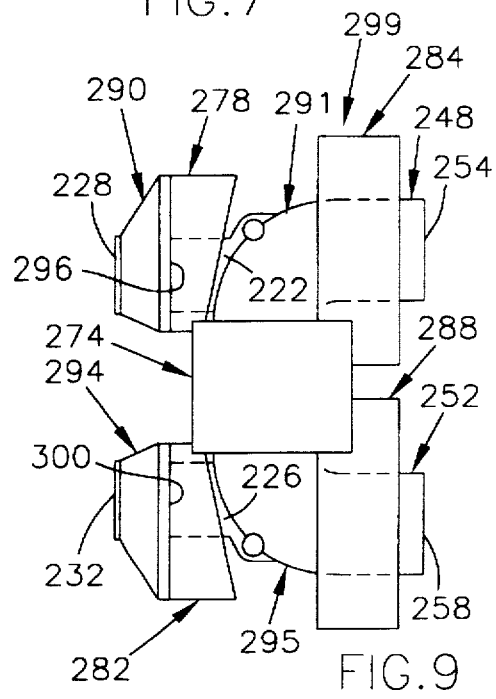

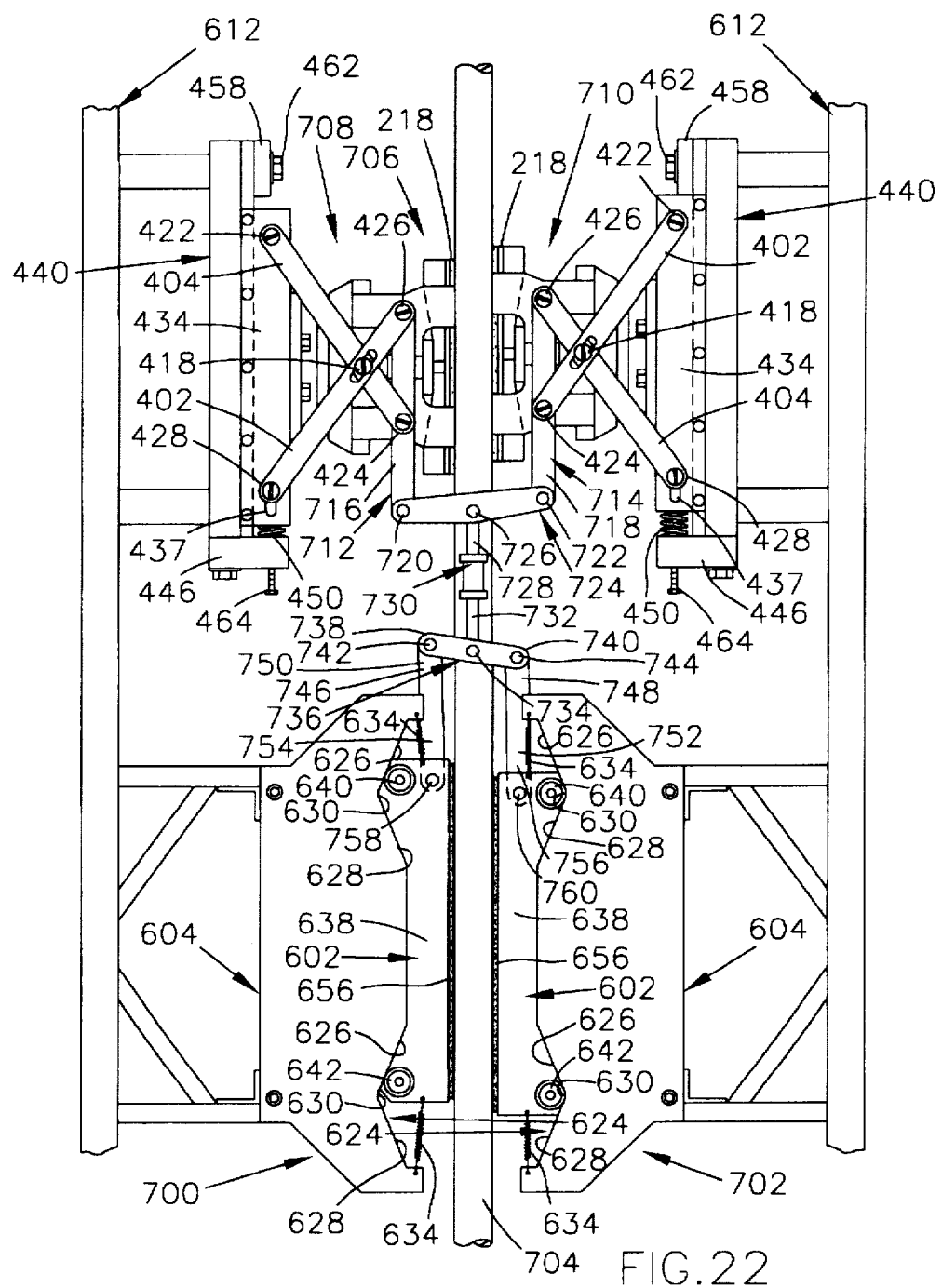
FIG. 22
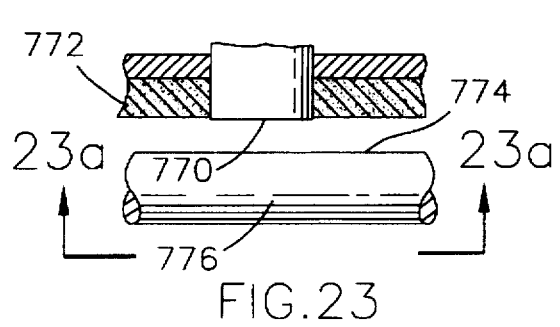
FIG. 23
FIG. 23a

MAGNETIC LATCH MECHANISM AND METHOD PARTICULARLY FOR LINEAR AND ROTATABLE BRAKES

This is a continuation-in-part of U.S. patent application Ser. No. 08/517,300, entitled, "Magnetic Latch Mechanism And Method Particularly For Trailer Brakes," filed Aug. 2, 1995, by the same inventor as the invention disclosed and claimed in this application, and allowed May 8, 1996, then to be issued on Dec. 10, 1996, as U.S. Pat. No. 5,582,275, and referred to below as the parent patent; which application is in turn a continuation-in-part of U.S. patent application Ser. No. 08/248,258, entitled, "Magnetic Latch Mechanism And Method Particularly For Brakes," filed May 25, 1994, by the same inventor as the invention disclosed and claimed in this application, and allowed Jan. 6, 1995, then issued on Aug. 22, 1995, as U.S. Pat. No. 5,443,132, referred to below as the grandparent patent. The disclosures of those applications and resulting patents, when issued, are therefore incorporated in this application by reference as if fully reproduced herein.

BACKGROUND OF THE INVENTION

The disclosures of those above-identified applications and resulting patents give a more complete background for each of the types of permanent magnet/electromagnet brake systems to which each such disclosure is directed and to which this disclosure is also closely related.

Typical current production brake systems for automotive type vehicles are either operated by controlling air pressure or hydraulic pressure to brake servos, or by electrically operated brakes. The brake mechanisms of such brake systems act in brake-engaging relation on rotatable members such as brake discs or brake drums attached to the vehicle wheels as well as on other parts of vehicle drive lines. Brake systems for vehicles which operate on one or more rails, guides or other linearly-extending brake-engaging members use similar brake actuators. Such guides extend parallel to the direction of linear travel of the vehicle required to be braked and can be rails, cables, rods, tracks, channel trenches, etc. They may or may not support the weight of the vehicle. The may or may not provide for lateral stability or vertical stability of the vehicle. Within the context of the invention herein disclosed and claimed, they are the fixed part of the brake system which is engaged, either physically or otherwise (e.g., magnetically or by eddy current and hysteresis, or both) so as to decelerate the vehicle while it is moving relative to them and/or to hold the vehicle in fixed, non-movable relation to them when and as desired. For simplicity, but without limitation and as appropriate, these various forms of guides may at times generically be referred to hereafter as guides and the vehicles associated with them as guided vehicles.

When the guided vehicles are passenger or freight elevators capable of moving vertically up and down or up and down relatively steep slopes, electrically and mechanically operated brakes are more common. With vehicles following tracks or rails such as passenger and freight trains or materials handling cars, as well as tractor-trailer freight vehicles operated on the highways, brakes have been used which operate for brake release on air pressure opposing heavily-loaded compression springs, the springs applying the brakes when there is insufficient pressure to hold the brakes in the released condition. Some electrically-guided materials handling cars of the type used in various manufacturing facilities usually have electrically-actuated brakes of some type. Some of the more recent trains which are electrically powered have used electrically powered and controlled brakes.

It is usual to have brake control or actuating mechanisms energized or deenergized to cause the brakes themselves to engage the guides. Thus, the brake control or actuating mechanisms are typically not the generators of brake force directly, but control the generation and application of brake forces. For example, that is the case for the trailer brakes of the above-identified parent U.S. Pat. No. 5,582,275 (to be issued from U.S. Ser. No. 08/517,300) and the parking brakes of the above-identified grandparent U.S. Pat. No. 5,443,132. Those patents contain considerably more detailed background information about types of these brake mechanism and should be consulted for such information. Some brakes disclosed in earlier patents use the electrically-generated forces to apply the brakes directly, and some examples are discussed below.

Typical patents disclosing earlier electrically actuated brakes of this general type include U.S. Pat. Nos. 3,668,445—Grove, issued Jun. 6, 1972; and 3,760,909—Grove, issued Sep. 25, 1973. They have brake activation arms, each of which has friction material and an electromagnet on one end so that when the electromagnet is energized the friction material engages a rotatable armature face which rotates with the wheel to be braked. The resultant drag force causes the brake activation arm to pivot about its other end, and the brake shoes are spread apart by a cam or spreader bar arrangement on that arm end. Thus the brake shoes are engaged with the brake drum, and apply braking force to the rotating brake drum so long as the electromagnet is energized.

Examples of U.S. Patents that disclose brakes acting on tracks, rails or the like are set forth below followed by a short description of each patent's disclosure. They include:

U.S. Pat. No. 3,799,298—Loomer, entitled, "Safety Brake Assembly for Elevators and the Like," and issued Mar. 26, 1974, discloses a mechanical elevator brake system which uses a wedging action to apply the several brake assemblies. The braking surfaces of the brake assemblies are constructed as toothed or serrated file surfaces, and are resiliently mounted on reciprocable carriers, and are normally disposed in spaced, confronting relation to braking surfaces on the mast on which the elevator travels. The mast is a type of rail. When the elevator descends at an excessive speed, sensed by an undisclosed device (which presumably may be some type of mechanical governor such as a fly-weight governor), that device releases the tension in cables, permitting springs to move rollers upwardly on inclined wedging surfaces, moving the reciprocable carrier brake assembly file surfaces into mechanical engagement with the braking surfaces of the confronting side of the mast. This engagement further increasing the wedging action of the rollers along the associated wedging surfaces, increasing the lateral pressure exerted by the file teeth against the mast. The initial engagement of these file teeth with the mast is a frictional braking action, followed by digging and scraping along the confronting side of the mast, stopping the descent of the elevator.

Thus, the release of the tension in the cables triggers the mechanical wedging action which moves the braking surfaces into engagement with the mast and then mechanically generates additional force further engaging the braking surfaces with the mast.

This disclosure is functionally somewhat similar to some automotive vehicle mechanical brakes in that there is a mechanical servo action which increases the total brake apply force. Automotive drum brakes commonly known as duo-servo brakes typically have a hydraulic pressure actuated wheel cylinder which, when pressurized, acts on brake shoes to engage the shoes with a brake drum. This is a hydraulic servo action. One brake shoe, urged by the rotational movement of the brake drum while that shoe is frictionally engaged with the drum, exerts a force on the other brake shoe, urging that other shoe harder into braking engagement with the brake drum. This is a mechanical servo action which follows the hydraulic servo action.

U.S. Pat. No. 4,482,034—Baermann, entitled, "Switchable Permanent Magnet Brake" and issued Nov. 13, 1984, discloses alternatingly fixed soft iron pole pieces and rotatably turnable permanent magnets, with the fixed pole pieces having stationary permanent magnets on their opposite ends. These stationary permanent magnets are positioned in engageable relation with the inner surfaces of flux return plates running lengthwise on a track and are arranged in rows along the return plates with alternately opposite magnetic poles.

In the switched-on state, the rotatably turnable magnets are positioned to cause an additional induction increase in the pole pieces. Thus the magnetic lines of flux pass into the flux return plates through one fixed pole piece and its stationary permanent magnets and return through the adjacent fixed pole pieces and their stationary permanent magnets, with the turnable magnets completing each such flux circuit. Eddy currents are induced in the flux return plates. The brake can be used as an eddy current and hysteresis brake without any friction braking contact.

In the switched-off state, the rotatably turnable magnets are moved 90° and the magnetic lines of flux emanating from the poles of the stationary permanent magnets are short-circuited via the iron pole shoes, which are in connection with the adjacent pole pieces. Alternatively, the switched-off state may be attained by turning the movable magnets 180° so that the fields are compensated by counter position.

Another species of this disclosure applies the same type of permanent magnet array to spaced rotating brake disks for road vehicles, with the turnable magnets being moved through gearing.

This disclosure employs only permanent magnets which are switchable on or off to attract or not to attract a friction braking element into braking engagement. It has no control of the magnetic flux polarities, strengths and orientations produced in the magnetic array by the use of a combination of permanent magnets and controllable electromagnets.

U.S. Pat. No. 2,972,485—Ferchland, entitled, "Magnetic Chuck" and issued Feb. 21, 1961, employs the same concept as that disclosed in U.S. Pat. No. 4,482,034—Baermann noted immediately above. In Ferchland's disclosure, the lines of flux from two sets of permanent magnets, separated by soft iron pieces, establish a magnetic circuit through an adjacent magnet flux-sensitive workpiece with each one of the permanent magnets of one set reinforcing the magnetic flux of one of the permanent magnets of the other set. The workpiece is magnetically released by moving one permanent magnet set so that the magnetic flux circuit flows only between the adjacent permanent magnets, one of each set, and the soft iron pieces, and does not flow into the workpiece. Movable permanent magnets and fixed permanent magnets for switching the appropriate parts of the magnetic flux fields on and off are therefore well known in several art areas.

U.S. Pat. No. 5,018,605—Hooghiem et al, entitled, "Magnetic Rail Brake Device" and issued May 28, 1991, discloses a magnetic rail brake device for rail vehicles. It has a permanent magnet which is movable up and down in a magnet housing by fluid pressure acting on one side or the other of a double acting cylinder piston to which the permanent magnet is connected. It is also continuously urged upward to the brake-released position by a spring assembly in the lower part of the cylinder and acting on the lower side of the piston.

In the brake-released position, the permanent magnet is moved up into the housing by fluid pressure and the force of the spring assembly, where it is held. In this position, the permanent magnet is sufficiently far removed from the rail so that it exerts little magnetic attractive force on the rail. Also, the magnetic field lines of the permanent magnet close their magnetic circuit through an upper part of the housing, minimizing the magnetic force that would otherwise attract the permanent magnet toward the rail.

To apply the brake, the piston is moved downwardly by fluid pressure acting on the piston, against the spring force exerted on the piston, until the permanent magnet housing approaches the rail. At that time, the permanent magnet's attractive force to the magnet housing is overcome by further movement of the piston, moving the magnet against the force of the permanent magnet's magnetic attraction to the upper part of the housing and on toward engagement with the rail. The permanent magnet then exerts its magnetic force through the brake blocks provided so that the brake blocks engage the rail in braking relation and the vehicle is decelerated.

In this disclosure there are only permanent magnets, and no electromagnets. A spring assembly holds the magnet in its released position. Similar to U.S. Pat. No. 4,482,034—Baermann described above, it positions the permanent magnet so that it closes its magnetic flux circuit through the upper part of the magnet housing, reducing its magnetic attraction to the rail.

U.S. Pat. No. 5,140,208—Tozoni, entitled, "Self-Adjusting Magnetic Guidance System for Levitated Vehicle Guideway" and issued Aug. 18, 1992, is of possible general interest only in that it is a non-contact self-adjusting magnetic guidance device using permanent magnets which interact with a guideway or rail. It is not described as being able to function as a brake, but is described as insuring a magnetically-levitated vehicle's stable and safe movement along the entire guideway without any physical contact between the vehicle and material bodies.

U.S. Pat. No. 5,467,850—Skalski, entitled, "Permanent Magnet, Magnetodynamic Safety Brake for Elevators and the Like" and issued Nov. 21, 1995, discloses a number of permanent magnets arranged along the car guide rail of an elevator. It does not have any electromagnets.

The permanent magnets are alternately disposed with opposite polar orientation to provide loops of magnet flux between the magnets and in the guide rail when the brake is actuated. The permanent magnets always exert a magnetic force on the guide rail, whether or not they are engaged with it in braking relation. The effective force exerted is only a function of the size of the air gap, if any, between the magnets and the guide rail. This effective force, with the maximum operational air gap, is still sufficient to move the magnets into engagement with the guide rail as soon as the "lift/release means" is actuated to release the magnets so that they can move toward the guide rail.

The magnetic brake is held away from the guide rail by a "lift/release means" which is a liftable pawl having a lip which engages a lip on a latch secured to the magnetic brake to hold the magnetic brake in its released position. When the brake is to be applied, a safety rod extending through the pawl and having a detent in the form of a washer and lock-nuts is lifted by a governor when the elevator exceeds a predetermined speed, causing the detent to engage the pawl and lift it, releasing the latch (thus the "lift/release means"). The permanent magnets are then moved by their magnetic attraction to engage them with the guide rail in friction braking relation.

In order to release the brake from its actuated braking condition, the magnetic forces holding the permanent magnets in braking relation with the guide rail are not diminished or otherwise manipulated; instead, they must be forcibly overcome by "considerable" force to move the magnets sufficiently far away to be engaged by the latching means which then mechanically latches them against movement back toward the guide rail because of the constant magnetic attraction that they continue to exert. This "considerable" force is actually sufficient brute force which must be more than the maximum magnetic attraction between the permanent magnets and the guide rail during their magnetic and physical engagement.

The disclosure shows a jack screw which must be manually rotated or screwed around to force the magnetic assembly away from the guide rail. This is much like a manually operated screw jack, rotated by a crank-like handle, which is often provided on the tongue of a travel trailer in order to lift the tongue to connect or disconnect the trailer to or from its tow vehicle. The force applied by that screw jack must be effective so as to be greater than the full tongue weight of the trailer in order to lift the trailer tongue from the hitch ball.

The patentee does recognize that this brute force can be supplied by an electric motor operated jack screw. This is comparable to the same trailer screw jack which is commonly available with a reversible electric motor drive. It is still the application of brute force which must overcome the entire amount of magnetic force exerted between the permanent magnets and the rail during braking. Another disadvantage if this arrangement is that the brakes are immobilized until the jack screw is reversed manually and reset so that it no longer prevents the brake from being actuated. This is a final step that may be easily omitted by accident, leading to further complications.

The permanent magnets of the magnetic brake of the patentee's disclosure have reduced-area magnet tips through which their lines of magnetic flux flow. This construction, referred to by the patentee as flux concentraters, squeezes those permanent magnet lines of flux through the smaller area, concentrating them at that tip. There is no construction or arrangement in which there is also a dispersal of any lines of flux from the permanent magnets or residual flux from the armatures of the electromagnets in this area, accomplished by a combined flux concentrater section and a flux dispersal section with electromagnet windings lines of flux being the ones that are concentrated.

FIELD OF THE INVENTION

The invention relates to mechanisms which are magnetically latched to and in an actuated position and magnetically to and in an unlatched position, and methods of using and operating such mechanisms. The invention more particularly relates to the magnetic latching and unlatching of a controlled magnetic latching device to a second member which may be either a linearly-extending fixed member such as a rail to which the device is relatively movable or a relatively movable member such as a brake disk or a brake drum. The controlled magnetic latching device has a magnetic array composed of one or more permanent magnets and one or more electromagnets. The controlled magnetic latching device is moved by either a combination of both permanent magnet and electromagnet magnetic forces or only electromagnet magnetic forces from the actuated position to a released position where it is not magnetically latched to the second member.

The controlled magnetic latching device is movable by permanent magnet magnetic forces in the magnetic array from a released position to an actuated position in which it is magnetically latched to the second member by permanent magnet magnetic forces.

When the controlled magnetic device is magnetically released from the second member, the permanent magnet magnetic forces magnetically latching it to the second member are minimized or negated by controlling the electrical energization and, when needed, the polarity of at least some of the electromagnets, and the controlled magnetic device is returned by either or both of a magnetically repellant force between the controlled magnetic device and the second member and a magnetically attractive force between the controlled magnetic device and a suitable magnetic backing plate. So long as the controlled magnetic device is magnetically latched to the second member, it is urged by permanent magnet magnetic forces to maintain the device in an actuated position, thus requiring no external energy energization of any of the magnetic array electromagnets.

The magnetic assembly may use a multiple number of permanent magnets as well as a multiple number of electromagnets having magnetic poles created in the armatures thereof when energized. An installation in a vehicle may use a multiple number of magnetic assemblies, particularly when used in conjunction with a linear guide member, rail, etc.

The magnetic assembly of the grandparent U.S. Pat. No. 5,443,132 noted above was used in a vehicle parking brake mechanism. In the application of that invention it was preferred that it use four to six electromagnets because of power requirements and space limitations. In the practice of the invention of that earlier grandparent patent, or of the invention of the later parent patent noted above whose preferred use was in a vehicle trailer brake mechanism, or of the invention herein disclosed and claimed, the magnetic assembly is not restricted to that range of numbers of electromagnets or to that range of numbers of permanent magnets. It may use fewer or more, depending upon the usage, location, space availability and configuration, type of magnetic materials employed, and magnetic power needed for the particular application. It may also depend to some extent on the number of brake units that may be installed on any one vehicle. In an elevator, for example, there may be one or more series of broke units, spacing them linearly. In some other installations, there may not be sufficient space for a multitude of brake units, and more magnets may be needed in each brake unit provided.

SUMMARY OF THE INVENTION

The invention herein disclosed and claimed in its broader aspects involves mechanisms having several features selectively employed in various combinations of features, such features including:

(1) mechanisms having a direct acting brake actuation and release by magnetic servo action;

(2) mechanisms having a direct acting brake actuation and release by a combination of magnetic servo action and mechanical servo action;

(3) a magnetic array of permanent magnets and electromagnets having oppositely disposed operating faces selectively magnetically manipulated by control of the electromagnets to attract, under one condition, one operating face to an element or member to be engaged in braking relation by frictional engagement of that one operating face with that element, that element and the magnetic array having relative movement which is to be braked;

(4) the last-mentioned relative movement having at least a component which is linear relative movement;

(5) a magnetic matrix on a moving body which moves in relation to another member, the magnetic matrix and the moving body to be braked in relation to that other member;

(6) a magnetic brake assembly comprising a magnetic array and a magnetic backing plate sub-assembly which is fixed in relation to the linear braking movement of the magnetic array which is transverse to the backing plate assembly; and (7) the magnetic array identified in paragraph (6) immediately above including one or more permanent magnets, the array having electrically connected therewith an electrical control system and also having electromagnet windings for controlling the direction and the strength of the magnetic fluxes of electromagnets in the magnetic array by controlling the amount and direction of the electrical current flowing in each of the electromagnet windings from no-current flow to a predetermined maximum current flow causing the electromagnets to be highly energized, the magnetic backing plate sub-assembly last identified having an operating face selectively and operatively engaging a first operating face of the magnetic array in magnetically attractive relation to hold the magnetic array in spaced relation to the other member by the magnetic force of at least some of the magnetic array electromagnets while the magnetic flux of at least one of the electromagnets counteracts the magnetic flux of the at least one permanent magnet of the magnetic array, a member to be selectively and operatively engaged in braking relation with a second operating face of the magnetic array upon the modification of the magnetic lines of flux of the various magnets of the magnetic array, movement of the magnetic array from its released position into magnetically attractive relation and in frictional engaging relation being driven only by the magnetic flux force of the at least one permanent magnet of the magnetic array.

More specific structural features of mechanisms embodying the invention, selectively employed in such mechanisms in singular form and in various combinations, include the following:

(A) an integrally complete magnetic assembly including a mounting frame having a magnetic backing plate sub-assembly thereon, a magnetic array having oppositely disposed operating faces and permanent magnets and electromagnets on the ends of at least some of which are located the operating faces, one of the operating faces facing the magnetic backing plate subassembly and the other operating face facing a member to be operatively engaged in braking relation by that other operating face, a mounting arrangement mounting the magnetic array to the mounting frame for movements relative thereto, the mounting frame being in turn secured to a fixed vehicle portion of a vehicle which is to be braked so that the magnetic array selectively moves to and from magnetic engagement of its one operating face with the backing plate subassembly and from and to magnetic engagement of its other operating face with the member to be operatively engaged in braking relation, the movement to the magnetic engagement of the other operating face with the member being accomplished subject to magnetic flux forces in the magnetic array which emanate only from at least one permanent magnet in that array and which flux forces magnetically attract the magnetic assembly to the member to be operatively engaged in braking relation;

(B) the integrally complete magnetic assembly described in paragraph (A) immediately above in which the magnetic backing plate subassembly is slidably mounted on the mounting frame and the magnetic array is mounted to the magnetic backing plate subassembly for controlled movements toward and away from the other member in directions transverse to the slidable movements of the magnetic backing plate subassembly;

(C) the integrally complete magnetic assembly described in paragraph (A) above in which a pin-and-bushing slide and guide arrangement for the magnetic array is employed;

(D) the integrally complete magnetic assembly described in paragraph (B) above in which the transverse movements of the magnetic array are controlled by a scissors-like mounting mechanism which includes a plurality of bar sets each bar set being comprised of a pair of bars which are operatively pivotally attached at one of a pair of adjacent bar ends to the backing plate subassembly and at the other of that pair of adjacent bar ends to the mounting frame, and the ends of the opposite pair of adjacent bar ends are pivotally attached to the magnetic array and the bars are also pivotally attached to each other at points intermediate their opposite ends, all pivotal attachments permitting pivotal movements of the bars only in planes which are either coextensive or are immediately adjacent to and in planar parallel relation with each other;

(E) the integrally complete magnetic assembly described in paragraph (A above in which the magnetic array has a hinge-like pivoting mount which is pivotally mounted on an axis on the mounting frame which extends parallel to and laterally spaced From the other member to be braked;

(F) a magnetic assembly having an integrally complete magnetic assembly described in any of paragraphs (A) through (E) above disposed on opposite sides of the other member to be braked so that braking action takes place on oppositely disposed surfaces on the other member;

(G) a magnetic assembly described in any of paragraphs (A) through (F) above in which the other member being braked has a generally rounded cross section which may be circular, elliptical or oval so that its friction surface or surfaces are curved, and the operating faces of the magnetic array or arrays engaging it are similarly curved so as to engage the curved friction surfaces in a curved mating manner;

(H) the magnetic assembly described in paragraph (G) above in which the other member is a rod or a cable; and/or (I) the magnetic assembly described in any of the above paragraphs (A), (B), (F), (G) or (H) in which a cam-actuated mechanical servo action may also be attained by suitable cam ramps and rollers, increasing the total brake apply force and causing the brake assembly to bring the vehicle to a stop more quickly.

More particular subfeatures of the invention which may be integrated into one or more of the mechanisms described in paragraphs (1) through (7) and the magnetic assemblies (A) through (I) above include the following:

(a) A relatively thin sheet or coating of elastomeric material may be provided between the magnetic array operating face which is selectively engageable with the backing plate subassembly and the backing plate subassembly, being secured to one or the other. This material acts to absorb shocks to the magnetic array as it engages the backing plate subassembly at the end of its releasing movement. This is helpful since the permanent magnets and electromagnet cores may be made of materials that are somewhat sensitive to physical shock engagements. Such materials are less likely to be damaged with the presence of this shock-decreasing layer of material.

(b) Various magnet pole pieces may have their end operating faces formed in an elliptical or oval cross-section so that the desired area of each operating face is attained even though the member being engaged is relatively narrow. Thus the narrow or shorter axis of the elliptical or oval cross-section is no longer than the relatively narrow width of the member being engaged, and the wider or longer axis extends in the linear direction of the member being engaged.

(c) The slidable mounting of the backing plate subassembly in some of the magnetic assembly configurations may be a dove-tail slide in cross-section with the trapezoidal dove-tail part fitting into a mating trapezoidal recess in sliding relation, permitting longitudinally sliding movements but substantially eliminating relative movements of the two parts in any transverse direction;

(d) A set of electromagnet windings, sometimes referred to as a coil and typically made of many windings of electrically conductive wire, may be elliptical or oval cross-section as seen in a plane which is perpendicular to the axis of such coil, with the coil axis being eccentrically located nearer one end of the elliptical or oval cross-section, the body of the coil at that nearer end being of greater thickness in the coil axial direction relative to the thickness of the body of the coil at the further one end of the elliptical or oval cross-section with more coil wire segments being in axial alignment and having less coil wire segments being in transverse alignment than the coil wire segments on the side of the axis of the coil which includes the further-away end of the elliptical or oval cross-section, permitting the coil to be installed on an axially shorter length pole piece or core with the axially thicker part of the coil being located where it has more axial room due to the construction of the magnetic array.

(e) The provision of magnetic flux concentrators/dispersers formed on the ends of pole pieces terminating at the magnetic array operating faces which have operating face areas no greater than the cross section areas of the pole pieces but are formed in the manner of truncated cones which flare outwardly away from the operating faces so as to provide end cover pieces engaged by ends of the electromagnet windings or coils which surround the pole pieces, such ends being axially near but spaced axially away from the operating faces of the pole pieces.

When the electromagnet coils are circularly annular in cross section with the pole pieces being received axially therethrough, then the parts of the flux concentrators/dispersers are also circularly annular at the bases of their truncated cone configurations. When the electromagnet coils are elliptical or oval in cross-section as described in paragraph (d) above, then the parts of the flux concentrators/dispersers are also in matching elliptical or oval in cross-section at the bases of their truncated cone configurations. Such flux concentrators/dispersers concentrate the magnetic lines of flux of the electromagnets generated when the electromagnets are energized from a cross-section area equal to that of the combined cross-section areas of the coils and the cores or pole pieces extending through them, but, when the operating face cross-section areas are no smaller than that of the pole pieces that are subject to the permanent magnet or magnets of the magnetic array do not concentrate the lines of magnetic flux at the operating faces.

Instead, it is believed that when the permanent magnets alone are magnetically active, the electromagnets being deenergized, the truncated cone enlarged base portions, extending radially outward from pole pieces through which the permanent magnet magnetic lines of flux pass, tend to slightly disperse the permanent magnet lines of flux, decreasing the magnetic flux activity when the operating face is not in engagement with its engageable face of either the backing plate subassembly (when the brake is applied) or is not engaged with the other member surface which is selectively engaged in friction braking relation (when the brake is in its released position), as may be the case. Empirical test results have indicated that this is the case, and these results have been found to be advantageous under some circumstances.

(f) The magnetic array as disclosed as part of the invention will perform as a magnetic manipulator, as a flux pump, and as both a magnetic manipulator and as a flux pump at the same time.

(g) The operating faces of the magnetic array preferably extend through friction braking material so that a larger friction braking area is provided than if the operating faces alone were engaging the other member engaged in braking relation. This will cause those faces to be worn away as the friction braking material wears away, but their life will be substantially increased because much more braking area is provided and the same amount of braking action can be attained with considerably less engagement force, resulting in considerably less wearing away of the friction braking material and the operating faces.

(h) The operating faces of the magnetic array which are engageable with the guide member such as a rail, and as needed part of all of their pole pieces, may be longer in the direction of linear extension of the guide member or rail than in the transverse direction, rather than circular, so as to accommodate to guide members or rails which are relatively short in that transverse direction. More specifically, they may be oval or elliptical in cross section, by way of example.

The brake mechanism of the invention herein disclosed and claimed has a latching mono-stable brake which is either disengaged from a member to be engaged in braking relation, or is engaged with it. It has one or more permanent magnets and one or more electromagnets. When there in no current flow in the one or more electromagnets, the one or more permanent magnets provide sufficient magnetic attraction to keep the operating faces of the magnetic array in engagement in braking relation with a friction surface on the member to be engaged. This is the completely stable condition of the brake.

When sufficient electrical current is passed through the one or more electromagnets, it cancels the magnetic attraction forces acting toward the member being braked which were created by the magnetic force of the one or more permanent magnets. It also generates a strong magnetic field on the opposite side of the magnetic array, causing it to be attracted to a magnetic backing plate on a fixed part of the brake assembly. Thus the magnetic array is held away from the other member friction surface, and the brake assembly is released from any braking action and held released so long as the electromagnets of the magnetic assembly are appropriately energized. This is a conditionally stable condition which exists only so long as the electromagnets are appropriately energized.

To generate partial, or modulated, braking effort, the electrical current in the one or more electromagnets is decreased, allowing the magnetic field of the permanent magnets to attract and latch the magnetic array to the other member friction surface with a net attractive magnetic force modulated by the amount of electrical current delivered to the electromagnets. The brake apply force is commensurate with the net effective magnetic field of the permanent magnets and electromagnets when such effective magnetic field attracts the magnetic array to the other member friction surface. In certain operations where the brake is relied upon to function in an emergency such as an overspeeding (usually descending) elevator, at which time there may also be electrical power failure, the magnetic strength of the permanent magnets must be sufficient to provide the desired deceleration.

While, following the concepts also disclosed in the patents of which this is a continuation-in-part application, the electrical current in the one or more electromagnets may be arranged to be controlled to generate electromagnetic fields which augment the magnetic field of the permanent magnets in their latching action of the magnetic array to the other member friction surface, thus increasing the effective brake actuating force, such power may not always be available. If it is, however, and the control circuitry is arranged to so control the brakes either using outside electrical power or stored electrical power as in a storage battery, additional braking force may be obtained. The use of a storage battery would usually work quite effectively, because the brake is primarily expected to be actuated automatically in an emergency when maximum braking is needed or should be available but outside electrical power may not be available. This could be the situation if there is not sufficient permanent magnet power to stop the vehicle at the maximum desired deceleration rate, even though there would be sufficient permanent magnet power to stop the vehicle at the deceleration rate required by law and regulations. It could also be arranged to provide for in-vehicle manual control so that an elevator car, for example, could have the brake partially released to let the car move slowly down until its doors are aligned with the doors on a building floor where it is safe for the passengers to exit the car.

When the brake mechanisms are to prevent overspeed and slow or even stop the vehicle when such overspeed occurs, one or more signal-generating sensors are provided to sense the actual vehicle speed and to signal the brake mechanisms to be actuated when that speed exceeds a preset value. This is very important in elevators as they are descending, and is often of importance when a vehicle is being automatically guided or controlled. When the permanent magnets alone are sufficient for all braking purposes, the power to the electromagnets is cut off, and the brake's magnetic array is immediately moved by the magnetic force of the permanent magnet or magnets to engage the rail or other member in braking relation.

It is also to be understood that brakes embodying the invention may be brakes for machinery other than vehicles. For example only and not by way of limitation, they may be brakes used in transmissions, dynamometers, power tools such as lathes, chain saws, table saws, band saws, routers, and planers, and any device or mechanism which requires the application and release of a brake to a moving or movable part or parts and/or the use of a brake to hold such a part or parts against movement.

BRIEF DESCRIPTION OF THE DRAWINGS

FIG. 1 is a schematic representation, in plan view, of a brake mechanism embodying the invention. It shows some parts broken away and in section.

FIG. 2 is a plan view of a brake mechanism, with parts broken away and in section and employing features of the invention illustrated schematically in FIG. 1.

FIG. 5 is a plan view illustration of a simplified two-pole-piece permanent magnet subassembly of the type employed in the schematic showing of the brake mechanism in FIG. 1.

FIG. 6 is a side elevation view of the subassembly of FIG. 5, taken in the direction of arrows 6—6 of that figure.

FIG. 7 is a side elevation view of the subassembly of FIG. 5, taken in the direction of arrows 7—7 of that figure.

FIG. 8 is a plan view illustration of a three-pole-piece permanent magnet subassembly of the type employed in the brake mechanism of FIGS. 2, 3 and 4, for example.

FIG. 9 is a plan view similar to FIG. 5, with the electromagnet windings in place on the magnetic array pole pieces. This figure also shows the installation or some modified electromagnet windings of the type shown in FIG. 10. Certain parts of the magnetic array pole pieces are modified as well so as to match the modified electromagnet windings.

FIG. 22 shows a modification of the brake mechanism mounting-arrangement in which the magnetic array assemblies of oppositely-acting brake units are connected through a load equalizer.

FIGS. 23 and 23a show a simplified representation, with parts broken away and in section, of a pole piece operating face which is engageable with the side of a rail which has a relatively short transverse extent friction braking surface. The view of FIG. 23a is taken in the direction of arrows 23a—23a of FIG. 23.

DETAILED DESCRIPTION OF THE VARIOUS EMBODIMENTS

Figure 3:
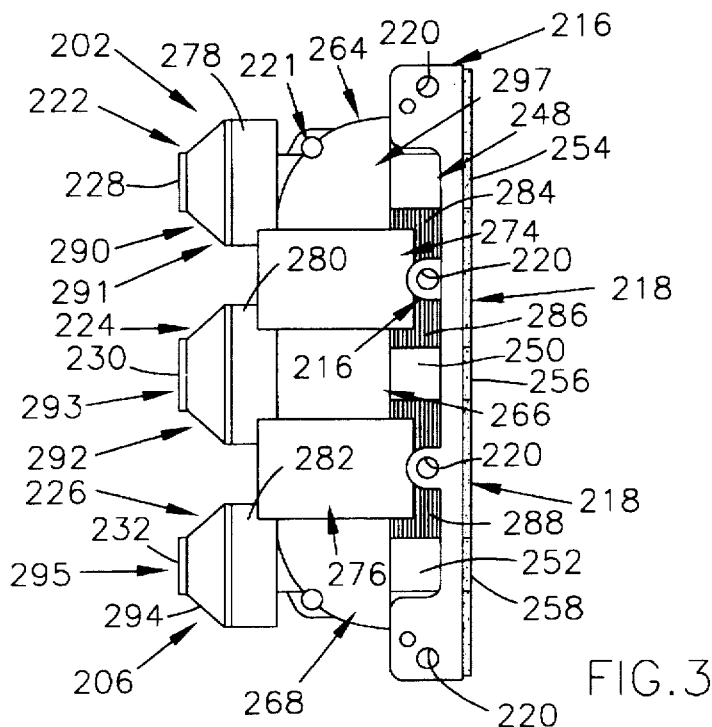
FIG. 3 is a view of the brake mechanism of FIG. 2 with an element removed so as to obtain a better view of certain other elements of the brake mechanism.

The schematic representation of the brake assembly 30 of FIG. 1 shows a magnetic assembly 32 which includes a magnetic array 34 and a magnetic backing plate assembly 36. It is shown in the brake-released position which will be later described in more detail. In the preferred embodiment, the magnetic assembly operates in conjunction with a linear guide assembly 38, which may be a rail, rod or cable. It is here illustrated as a portion of a rail which is shown in cross section. The linear guide assembly may be a guide rail in a vehicle such as an elevator installation, or may be a rail over which a vehicle such as a train or a car passes during its travels. The rail may be a separate rail provided only for braking action of the vehicle, or may have other functions in addition to providing one or more braking surfaces to be selectively engaged by a portion of the brake assembly 30.

The magnetic backing plate assembly 36 includes a magnetic backing plate 40 which is made of a suitable magnetic-sensitive material which can easily transmit magnetic lines of flux but is of itself not a permanent magnet. Permanent magnets 42 and 44 are secured to the plate 40 so as to have their faces 46 and 48 in magnetic and physical engagement alignment with the faces 50 and 52 of the two armatures 54 and 56 of the electromagnets 58 and 60 of the magnetic array 34. Armatures 54 and 56 are pole pieces of the magnetic array 34, as will be further described. The drawings identify the magnetic polarity of the various magnets as N for North and S for South, using the conventional magnetic pole terminology. Magnet 42 has its permanent North magnetic pole at its face 46 and its permanent South magnetic pole on its face 62 which engages the magnetic backing plate 40. Magnet 44 has its permanent South magnetic pole at its face 48 and its permanent North magnetic pole at its face 64 which engages the magnetic backing plate 40. It can be seen that the magnetic backing plate 40 is therefore able to transmit magnetic flux between the permanent magnet pole faces 62 and 64 when a magnetic flux circuit is completed between the permanent magnet pole faces 46 and 48.

A suitable potting material 66 is used as a part of the magnetic backing plate assembly 36 so as to provide recesses in which the permanent magnets 42 and 44 are encased between their faces. The potting material 66 has a face 68 which is coplanar with the permanent magnet faces 46 and 48. As shown in later-described FIGS. 2–4, 11–13, 15–16 and 19, but not shown in the schematic representation of FIG. 1, a suitable resilient shock-absorbing material may be used to cover at least the faces 46 and 48 of permanent magnets 42 and 44, or to also cover the face 68 of the potting material 66. This may be a thin rubber-like sheet made of an elastomeric material that will withstand the environment to which this part of the brake assembly 30 is exposed. This resilient material is abruptly engaged by the pole piece faces 50 and 52 at the end of the brake releasing action of the assembly 30 and absorbs much of the shock of such engagement, tending to prevent damage to the magnets 42 and 44 and/or the pole pieces 54 and 56.

The magnetic array 34 has two other pole pieces 70 and 72 and a cross bar 74 having a permanent magnet 76 at its center. Pole pieces 54, 70 and a part 78 of cross bar 74 are integrally formed of a suitable magnetically-sensitive material to provide a pole piece subassembly 80 having pole pieces 54 and 70 extending in opposite directions. This subassembly can easily transmit magnetic lines of flux but is of itself not a permanent magnet. Pole pieces 56, 72 and another part 82 of cross bar 74 are integrally formed of a suitable magnetically-sensitive material to provide a pole piece subassembly 84 having pole pieces 56 and 72 extending in opposite directions but substantially parallel to pole pieces 54 and 70. This subassembly 84 can also easily transmit magnetic lines of flux but is of itself not a permanent magnet. Pole piece subassemblies 80 and 84 and permanent magnet 76 are secured together to form an H-shaped part of the magnetic array 34 with pole pieces 54 and 70 forming one side of the H-shape and pole pieces 56 and 72 forming the other side of the H-shape, and the cross bar of the H-shape being formed by cross bar 74.

The pole piece 70 has an operating face 86 and pole piece 72 has an operating face 88. These faces 86 and 88 are respectively oppositely disposed from the operating faces 50 and 52 of pole pieces 54 and 56. The ends of pole pieces 70 and 72 extend through a structural plate 90 and friction material 92 secured to plate 90. In the brake released condition, the friction face 94 of friction material 92 and the operating faces 86 and 88 of the pole pieces 70 and 72 are spaced from the friction surface 96 of the guide assembly 38. Therefore there is no braking action taking place between the brake assembly 30 and the guide assembly 38, and, insofar as the brake mechanism is concerned, the vehicle in which the brake assembly 30 is installed is free to move relative to the guide assembly 38.

When permanent magnet 76 has it magnetic North pole engaging the cross bar part 78, and its magnetic South pole engaging the cross bar part 82 as shown, the pole pieces 54 and 70 will be magnetic North poles and the pole pieces 56 and 72 will be magnetic South poles because of the magnetic flux of permanent magnet 76, so long as there is no electromagnet magnetic influence on them.

However, the windings of electromagnets 58 extend about pole pieces 54 and 70 in one wound direction, and the windings of electromagnet 60 extend about pole pieces 56 and 72 in the oppositely wound direction. As schematically shown, these two windings are connected in parallel to the electrical wires 98 and 100, which are in turn connected to a suitable source or sources of direct current through the Electronic Control Unit 95 more completely shown in FIG. 24. The return path to the ECU 95 from the windings 58 and 60 are though electrical wires 97 and 99. A voltage meter 101 is illustrated as being positioned to indicate the voltage between wires 97 and 98. An ammeter 103 is illustrated as being positioned in electrical wire 99 to indicate the amperage in that wire.

There is a third set of electromagnet windings 102 wound about the permanent magnet 76 of the cross bar 74. These windings are also connected to wires 98 and 100 in the same manner as the other windings 58 and 60 earlier described. They are so wound that they have South polarity magnetic flux at the end of permanent magnet 76 attached to the part 78 of cross bar 74, which is also part of the pole piece subassembly 82, and North polarity magnetic flux at the end of permanent magnet 76 which is attached to the part 82 of the cross bar 74, which is also a part of the pole piece subassembly 84. It can be seen that, when electromagnet windings 102 are energized together with windings 58 and 60, the magnetic flux created by windings 102 is of opposite polarity in relation to the polarity of permanent magnet 76. Thus the magnetic flux strength of windings 102 can be sufficient to counteract the permanent magnet magnetic flux strength, effectively causing the permanent magnet cross bar be canceled and the net magnetic flux strength at the pole ends of the permanent magnet 76 to be substantially zero. of course, if a still greater amount of electrical current is sent through windings 102, the part 78 will be of South magnetic polarity and the part 83 will be of North magnetic polarity.

Using the simplified wiring arrangement schematically illustrated in FIG. 1, the windings 58 and 60 are electrically energized equally with the windings 102. Electrically energized windings 58 cause the pole pieces 54 and 70 to have South polarity, and electrically energized windings 60 cause the pole pieces 56 and 72 to have North polarity. The polarities at pole faces 50 and 52 are then in opposition to the polarities at their adjacent faces 46 and 48 of the permanent magnets 42 and 44, and are magnetically attracted to them at the same time that the magnetic field of the permanent magnet 76 is effectively canceled. This so decreases the magnetic attraction of the pole faces 86 and 88 to the guide assembly 38 that it cannot longer resist movement of the magnetic array 34 away from the guide assembly. At the same time, the magnetic attraction between the pole faces 50 and 52 and the permanent magnet pole faces 46 and 48 of the backing plate permanent magnets 42 and 44 is sufficient to move the magnetic array 34 away from the guide assembly and into magnetic latching attachment to the backing plate assembly 36. This condition will be maintained so long as the electromagnets are held energized so as to maintain the requisite magnetic field strengths and polarities, and the brake assembly is maintained in the brake released position.

When the electromagnet windings 58, 60 and 102 are deenergized, the magnetic attraction forces between the pole piece 54 and magnet 42 and the pole piece 56 and magnet 44 change to magnetic repulsion forces. At the same time, the magnetic attractions at pole faces 86 and 88 to the guide assembly 38, caused only by the magnetic flux field of the permanent magnet 76, attract those pole faces to the guide assembly 38 so that they, and the friction material 92, engage the face 96 of that guide assembly. The brake assembly is then in the brake applied condition, and the vehicle in which the brake assembly 30 is installed is decelerated and may be stopped in its movement relative to the guide assembly.

The magnetic flux strength of each of the electrically energized windings 58, 60 and 102 depends upon the number of windings in each electromagnet and the amount of electrical current being passed through each winding. Each of the windings may have the same number of windings in them, thus generating the same electromagnet magnetic flux strength with each of them. Alternatively, more or less windings can be placed around pole pieces 54 and 56, for example, than are placed around pole pieces 70 and 72, increasing or decreasing the South polarity magnetic flux strength at pole face 50 and the North polarity magnetic flux strength at pole face 52 in relation to the same polarity magnetic flux strengths respectively at pole faces 86 and 88. Changes in magnetic flux strength may also be made by changing the current passing through the windings. In the preferred embodiments, a constant current is desired for reasons set forth below.

Still another alternative is to have separate windings about each of the pole pieces 54, 56, 70 and 72, which may or may not have different numbers of windings, and which may be separately controlled, both as to polarity and magnetic flux strength generation.

As yet another alternative, the leg lengths of pole pieces 54 and 56 may be made either the same length as, or shorter or longer than, the leg lengths of pole pieces 70 and 72, changing the length of the magnetic circuits through the pole pieces 54 and 56 in relation to the length of the magnetic circuits through the pole pieces 70 and 72. These two latter alternatives and the characteristics of the results obtained with each of them are described more thoroughly in the parent U.S. Pat. No. 5,582,275, to be issued from patent application Ser. No. 08/517,300 as above identified, and need not be repeated here in detail.

The pole pieces 54 and 56 are shown in FIG. 1 with another feature of the invention, namely the provision of the magnetic flux concentrators/dispensers 104 and 106. As will be described more specifically below in relation to FIGS. 5 through 10, they concentrate the electromagnetically generated magnetic flux lines as they flow between faces 46 and 50 and between faces 48 and 52, and when only the magnetic flux lines of permanent magnet 76 are present, they tend to disperse them to some extent, lessening a slight residual magnetic effect at pole faces 50 and 52. This lessening effect aids in providing less magnetic attraction between those pole faces and the backing plate permanent magnets as the brake application mode is initiated by deenergizing the electromagnets.

FIG. 2 shows a brake assembly 200 embodying the invention. The various portions of this assembly are essentially the same structure as that shown schematically in FIG. 1. When this brake assembly is used in conjunction with any type of linear mechanism such as rails, cables, rods, tracks and trenches, by way of example, it can engage such linear mechanism in braking relation so long as the linear mechanism is readily susceptible to magnetic lines of flux so as to become temporarily magnetized when exposed to such lines of flux. The brake assembly 200 is a self-contained, self-sufficient unit containing all of the necessary components and energy sources to provide braking action. While it does not require any outside energy source for braking action, it does require a source of energy (electrical power) to release the brake and to maintain the brake in the released position. The brake assembly, or as is more often the case, a number of such assemblies, will stop or control a vehicle. The vehicle can be an elevator car, train, tram, ski-lift, roller coaster, dumb waiter, materials handling equipment programmed to follow a selected path, etc. It may be but is not necessarily a motor car or truck, in which instance it can brake against a rotatable member rather than a relatively fixed linearly extending member.

Figure 4:
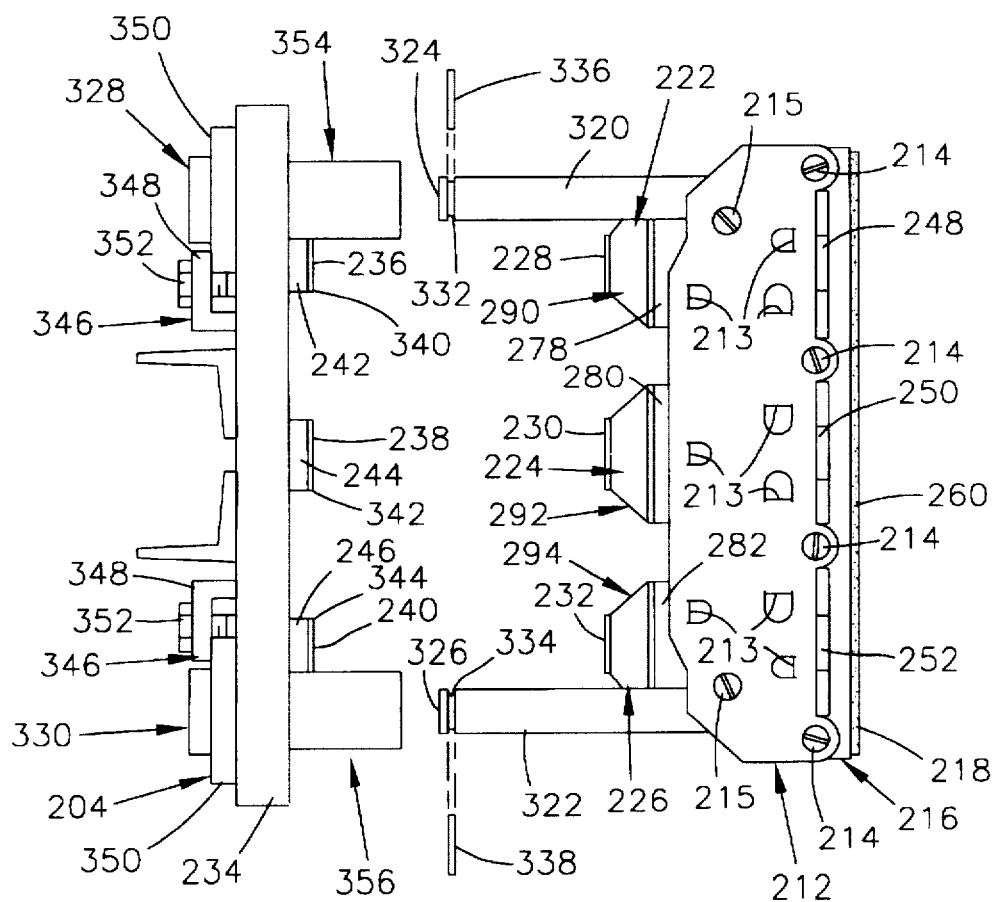
FIG. 4 is another plan view of the brake mechanism of FIG. 2 showing the magnetic backing plate assembly and the magnetic array assembly in spaced-apart relation to clearly illustrate the particular slidable mounting arrangement of the magnetic array assembly to the magnetic backing plate assembly.

Various aspects of a brake assembly 200 are shown in FIGS. 2, 3 and 4. In FIG. 2, it is shown as including a magnetic assembly 202 which is comprised of a magnetic backing plate assembly 204; a magnetic array 206; a guide member 208 which may be a rail, cable, rod, track or trench by way of example; and a guide and support mechanism 210 for the magnetic array 206.

The magnetic assembly 202 is shown in better detail in FIG. 3. In that figure, the capture plate 212 of FIG. 2 has been removed to show parts of the magnetic array 206 that would otherwise be hidden from view. In FIG. 2, capture plate 212 is shown as being attached by screws 214 to the friction material support plate 216. That plate is also attached to the magnetic array 206 by screws 215. Part of this attachment structure is not shown because a part of one end of the capture plate 212 has been broken away. Plate 216 supports the friction material 218, which is the equivalent of the friction material 92 of FIG. 1.

Figure 11:
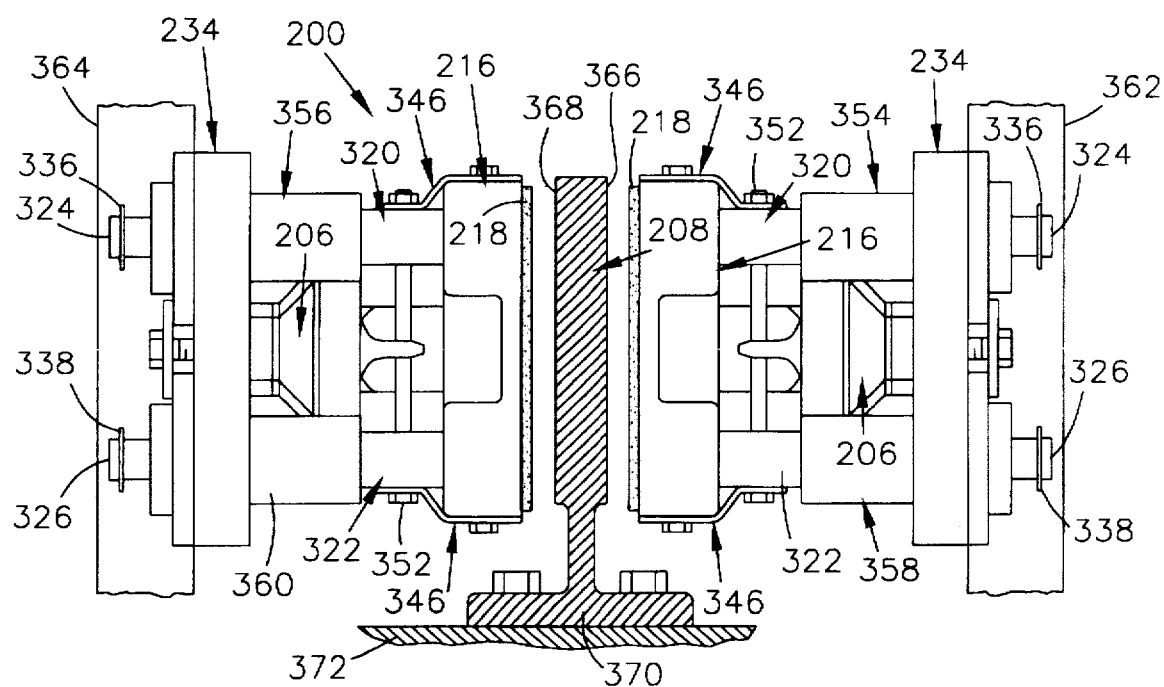
FIG. 11 shows a brake assembly in which opposed brake assemblies such as those shown in FIGS. 2, 3 and 4 are positioned to engage opposite sides of a rail in braking relation when actuated.
Figure 12:
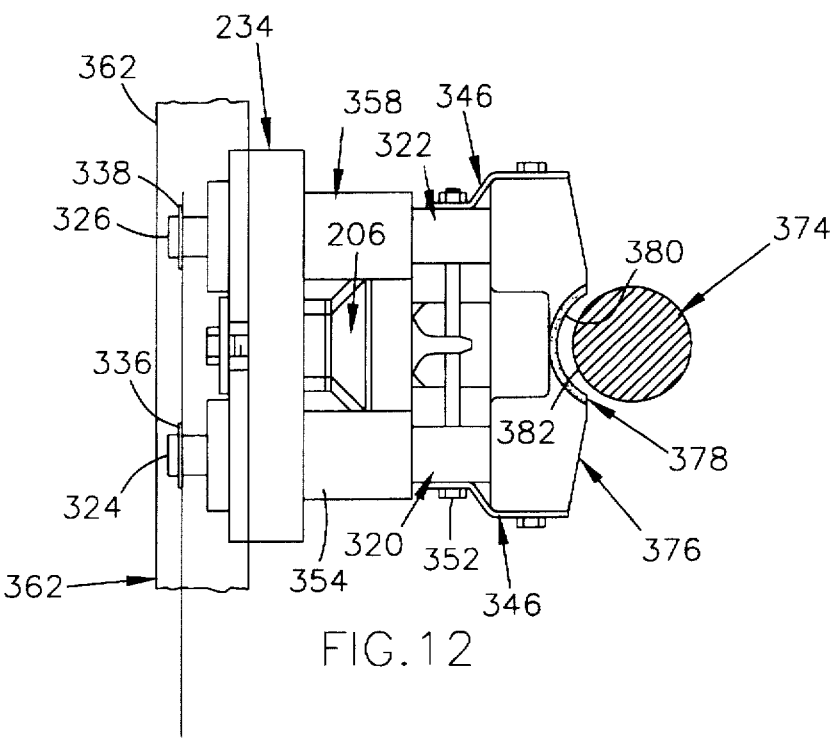
FIG. 12 shows a brake assembly similar to that shown in FIGS. 2, 3 and 4, with the friction-engaging portion thereof being contoured so that the rail of FIG. 2, for example, is replaced by a cylindrical member such as a bar or cable which is circular in cross section.

In FIG. 3, the friction material support plate 216 is shown as being provided with screw holes 220 into which screws 214 are threaded to secure capture plate 212 and support plate 216 together, and the magnetic pole pieces 264 and 268 are shown as being provided with screw holes 221 which receive screws 215 (only one being shown in FIG. 2 because of the broken-away portion) which secure the magnetic array 206 to the capture plate 212. If screws 215 extend through the magnetic array 206 as shown in FIGS. 11 and 12, they may be secured by a nut. As seen in those two figures, there are upper and lower capture plates 212, and the screws extend through openings in both of them and hold them together. Similarly, both capture plates 212 are also secured to the upper and lower surfaces of the friction material support plate 216 (support plate 376 in FIG. 11).

The capture plate 212 contains tabs 213 that are struck inwardly as seen in FIG. 2. These tabs 213 hold the pole piece and permanent magnet subassembly 297 (described below and shown in FIG. 8 without other parts of the brake assembly) and the electromagnet windings 274, 276, 278, 280, 282, 284, 286 and 288 (also described below and shown in FIGS. 2, 3, and 4, and which with the pole piece and permanent magnet subassembly 297 form the magnetic array 206), in correct alignment.

The magnetic array 206 illustrated in FIGS. 2, 3 and 4 has three magnetic pole pieces 222, 224 and 226. These pole pieces respectively have operating faces 228, 230 and 232 which are operatively engageable with and disengageable from the faces 236, 238 and 240, respectively, of permanent magnets 242, 244 and 246, respectively, on the magnetic backing plate 234, as better seen in FIG. 4

As seen in FIG. 3, the magnetic array also has pole pieces 248, 250 and 252 which are effectively extensions of pole pieces 222, 224 and 226 respectively, extending in the opposite direction from those pole pieces. Pole pieces 248, 250 and 252 extend through the friction material support plate 216 and the friction material 218 and respectively terminate with operating faces 254, 256 and 258. These faces are coplanar with the face 260 of the friction material 218.

These pole pieces, as well as cross bar 262 of the magnetic array 206, are better shown in FIG. 8. The cross bar 262 includes section 263, which is actually integrally joined with the pole pieces 222 and 248. It also includes a similar section 266, which is actually integrally joined with the pole pieces 224 and 250, and another similar section 267, which is actually integrally joined with the pole pieces 226 and 252. Sections 263 and 266 are joined with a permanent magnet section 270, shown in FIG. 8, which is similar to permanent magnet 74 of FIG. 1. Also shown in FIG. 8, sections 266 and 267 are joined with another permanent magnet section 272.

Magnetic pole pieces 222 and 248, flux concentrator/disperser 290, and section 263, may be cast as a unit 291. Magnetic pole pieces 224 and 250, flux concentrator/disperser 292, and section 266, may be cast as another unit 293. Magnetic pole pieces 226 and 252, flux concentrator/disperser 294, and section 267, may be cast as another unit 295. These units may be made of soft iron or other suitable material which is easily magnetized so long as magnetic flux lines pass through it, but does not retain residual magnetism when the magnetic flux lines do not pass through it.

When magnetic pole piece units 291, 293 and 295 and the permanent magnet sections 270 and 272 are joined together, the resultant subassembly shown in FIG. 8 is referred to as the pole piece and permanent magnet subassembly 297. Also, it is to be understood that, while FIG. 8 illustrates three pole piece units, more could be added if desired, by inserting additional such units between units 293 and 295 which are constructed in the manner of unit 293, with appropriate permanent magnet cross bars.

FIGS. 5, 6 and 7 show a pole piece and permanent magnet subassembly 299, similar to the pole piece and permanent magnet subassembly 297 of FIGS. 2, 3, 4 and 8, but having only two pole piece units 291 and 295. In these FIGS. 5, 6 and 7, the flux concentrators/dispersers 290 and 294 are concentric with their respective pole pieces 222 and 226, so that their bottom surfaces 296 and 300 are coaxial with the axes of those respective pole pieces. Therefore, subassembly 297 has only the one permanent magnet 270 in its cross bar 262, and that subassembly is comparable to the one shown schematically in FIG. 1. Subassembly 293 would use concentric, equally-wound electromagnet windings rather than the eccentrically offset windings of FIGS. 10, 10a and 10b which are described in greater detail below.

The magnetic array 206 of FIGS. 2, 3 and 4 includes the electromagnet windings 274 and 276 respectively wound about the permanent magnet sections 270 and 272; the electromagnet windings 278, 280 and 282 respectively wound about pole pieces 222, 224 and 226; and the electromagnet windings 284, 286 and 288 respectively wound about pole pieces 248, 250 and 252. These electromagnet windings are omitted from FIG. 8 so that the pole piece structures may be more clearly seen.

Figure 10:
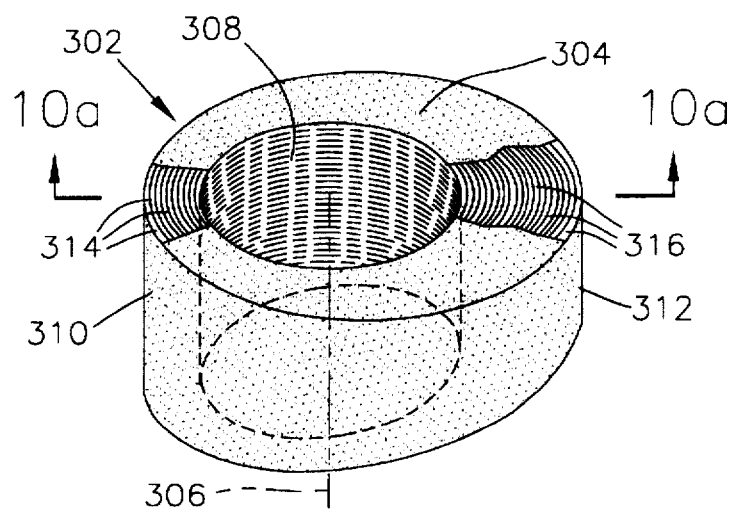
FIG. 10 is a perspective view of an eccentrically wound electromagnet winding set so that it is axially thicker but diametrically narrower on one side as compared to its diametrically opposite side.

At least some of the electromagnetic windings may be shaped as seen in FIG. 10. In FIG. 3, electromagnetic windings 278 and 282 are clearly shown to use this configuration. When so used, the pole pieces on which they are eccentrically mounted as well as the pole piece concentrators/dispersers are shaped to accommodate them.

As can be seen in FIGS. 2, 3, 4 and 8, the pole pieces 222, 224 and 226 are formed to provide truncated conical cone ends which are flux concentrators/dispersers 290, 292 and 294, respectively. They are located near the operating faces 228, 230 and 232, respectively, of these pole pieces, and clearly appear in FIGS. 2, 3, 4 and 8 as having a truncated cone appearance, with a pole operating face being at or axially just beyond the truncated top of each cone, and the wider bottom of the cone being of larger diameter than the main body of each pole piece. If the electromagnet windings 278, 280 and 282 are all annular with the inner and outer surfaces being on concentric circles, then the surfaces 296, 298 and 300 of the truncated cone bottoms of the flux concentrators/dispersers 290, 292 and 294, respectively, would be similarly shaped so that one end of each set of windings engages and basically covers one of the annular cone bottom surfaces, being substantially coextensive in area and shape with each other.

However, wherever the elliptical or eccentric formation of one or more sets of electromagnet windings 302 of FIG. 10 are used, for example in place of windings 278, 280 and 282, the corresponding truncated cone bottom surfaces 296, 298 and 300 of the flux concentrators/dispersers would have an eccentric annular surface matching the eccentric annular surface 304 of the winding set 302 that is in a plane substantially perpendicular to the axis 306 of the eccentrically located center opening 308 of the winding set. This means that the flux concentrator/disperser associated with such a winding set would have its pole piece located off-center to mate with the off-center hole through the winding set. This off-center offset of the pole pieces for the flux concentrator/dispersers 290 and 294 of FIG. 3, for example, would be in a direction away from the center pole piece 224 as seen in that Figure. This would allow the axially thicker part 310 of a winding set 302 to be located in the less axially crowded areas between the truncated cone bottoms 296 and 300 and the adjacent part of cross bar sections 264 and 268 and the axially thinner part 312 of the winding set to be located in the more axially crowded areas. This also permits some compression of the magnetic circuits, making them more efficient. When the winding coils are not axially compressed on one side to accommodate more closely to the shape of each unit (e.g., pole piece units 291, 293 and 295), the pole pieces around which the windings are fitted would have to be axially longer to allow for the axially larger electromagnet windings. It is to be understood, of course, where it is desirable for using the available room most efficiently, there are times when the eccentric winding sets and eccentric truncated cone bottoms of flux concentrators/dispersers may be used.

For pole piece 224 to use an eccentric set 302 of windings in place of the winding set 280, the axially thinner section 312 of a set 302 would probably be the part seen installed on the pole piece 224 of FIGS. 2, 3, 4 and 8, and the axially thicker section 310 would be underneath the thinner section so that it would more easily clear the part of the cross bar section 266 that is joined with pole pieces 224 and 250, but not seen in FIG. 3. FIG. 8 shows this variation. For simplicity, and since either annular circle winding sets or eccentric winding sets may be used, other figures show the annular circle winding sets.

FIG. 9 also shows a magnetic assembly having a pole piece subassembly similar to the magnetic pole piece subassembly of FIG. 8. However, instead of having three sets of pole pieces units, it has two sets of pole piece units such as pole piece units 291 and 295 which are joined by a cross bar 262 having a single permanent magnet (not shown, being hidden in this view by its electromagnet windings 274 such as permanent magnet 270 of FIG. 8 joining the two pole piece units 291 and 295. Thus its configuration is comparable to the similar construction shown schematically in FIG. 1, but using the elliptical or offset electromagnet windings 278 and 282 as well as the elliptical or offset flux concentrators/dispersers 290 and 294 shown in FIG. 8.

Figure 10A:
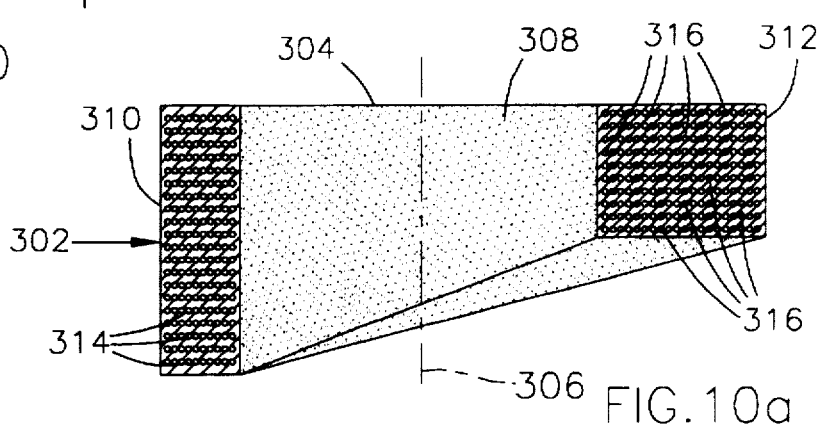
FIG. 10a is a fragmentary cross section view taken in the direction of arrows 10a—10a of FIG. 10 and showing an arrangement of layers of winding coils in the axially thickest but diametrically narrowest part of the winding set and showing an arrangement of layers of winding coils in the axially thinnest but diametrically widest part of the winding set.

As is somewhat schematically shown in FIGS. 10, 10a only by way of example and in no way providing a limitation or even guidelines as to the actual number of windings to be used in any particular unit, the windings are fifty in number, in ten layers 314 of five wires each at the axially thickest part of the winding set and in five layers 316 of ten wires each at the axially thinnest part of the winding set, the wire windings making the transition from ten layers 314 to five layers 316 and then from five layers 316 to ten layers 314 as they are wound. The actual number of layers 314 and 316 used in the axially thicker and thinner parts also depends upon the needs of the particular unit. While the specific ratio of the number of layers and wires in the part shown in left side of FIG. 10a to those in the part shown in right side of FIG. 10a are not critical, nevertheless, in order to have reasonable benefit of this construction, it is likely that the ratio of layers between the left side of FIG. 10a section and the right side of FIG. 10a section should be from about 1.25:1 upward. It may be that a ratio of such layers could be on the order of 4:1 or so, and possibly even more. When considering such ratios, it is understood that the number of wires in each layer would be in the reverse ratio. Thus, for a layer ratio of 1.25:1, the wire ratio would be 1:1.25, and for a layer ratio of 4:1, the wire ratio would be 1:4. For illustrative purposes only, the layer ratio actually shown in FIG. 10a and lob is 2:1 and the wire ratio is 1:2. Of course, in an annular circular winding set, the same number of layers and the same number of wires per layer are used throughout the circumference of the winding set, so that their ratios are always 1:1 if they were cross-sectioned as shown in FIG. 10a.

FIG. 4 also shows, in exploded format, a pin-and-bearing arrangement for slidably guiding the movements of the magnetic assembly 202 toward and away from the magnetic backing plate assembly 204 as it moves toward the brake release position and toward the brake apply position, respectively. Pins 320 and 322 are secured to the friction material support plate 216 at one of their ends. When assembled, their other ends 324 and 326 extend through the guide bushing or bearing assemblies 328 and 330, respectively, so that their parts intermediate their ends are in slidable relation to those assemblies. Pin ends 324 and 326 extend outwardly beyond those assemblies, and annular grooves 332 and 334 are formed thereon. Suitable clips such as C-clips 336 and 338 are clipped into grooves 332 and 334 and prevent the pin ends 324 and 326 from moving back into the guide bushing or bearing assemblies 328 and 330, limiting the maximum brake-applying travel of the magnetic assembly 202.

The engagement of the pole piece operating faces with the operating faces of backing plate permanent magnets 242, 244 and 246, either directly or through the elastomeric material 340, 342 and 344 shown as being located on the operating faces 236, 238 and 240, respectively of the backing plate permanent magnets. As earlier noted, when the magnetic assembly 202 is moved into the released position, such elastomeric material absorbs some of the shock of engagement of the aligned operating faces, protecting the magnets as well as the pole pieces having those operating faces.

The guide bushing or bearing assemblies 328 and 330 are removably inserted through openings in the magnetic backing plate 234 so that they may be readily replaced if and as necessary. They are shown as being held in their operative positions by screw and clamp retainers 346. Each clamp 348 engages a flange 350 formed on the outer end of each assembly 328 and 330, and the screw 352 is tightened by screwing it into a threaded hole provided in the backing plate 234, causing the clamp 348 to tightly grip the flange 350 and hold each assembly 328 and 330 in place. Other suitable arrangements may be used to removably secure the assemblies 328 and 330 to the magnetic backing plate 234. As is better seen when considering FIG. 11 or FIG. 12 in conjunction with FIG. 4, there are preferably four sets of pin-and-bearing units for each brake assembly, with two upper ones 354 and 356 being visible in FIG. 4 and two lower ones hidden under them. In FIGS. 11 and 12, each brake assembly has one of the upper ones and one of the lower ones shown, with the other of each of the upper and lower ones being hidden behind them.

FIGS. 11 shows a pair of opposed brake assemblies 200 of the type shown in FIGS. 2, 3 and 4, for example, which act on the opposite sides of a guide member 208 formed as a rail. The view is that of end views of these brake assemblies. Thus one brake assembly 200 has an upper pin-and-bearing unit 354 and a lower pin-and-bearing unit 358 visible, and the other brake assembly has an upper pin-and-bearing unit 356 and a lower pin-and-bearing unit 360 visible. The one brake assembly 200 also has the magnetic pole piece 222 with its flux concentrator/disperser 290 and its electromagnet windings 278, and its magnetic pole piece 224 with its flux concentrator/disperser 292, shown in this view. The magnetic backing plate 234 is also in view, as well as the friction material support plate 216 and the friction material 218. The other brake assembly 200 also has the magnetic pole piece 226 with its flux concentrator/disperser 296 and its electromagnet windings 278, and its magnetic pole piece 224 with its flux concentrator/disperser 292, shown in this view. The magnetic backing plate 234 of the other brake assembly 200 is also in view, as well as the friction material support plate 216 and the friction material 218.

The brake assemblies 200 of FIG. 11 are securely mounted on parts 362 and 364 of a vehicle to be braked. If, for example, the vehicle is an elevator which moves vertically up and down, rail 208 extends linearly in a vertical orientation and the elevator moves in directions into and out of the drawing perpendicularly to the plane of the paper on which the drawing is printed. If the vehicle is movable horizontally, then rail 208 extends linearly in a horizontal orientation. The brake assemblies 200 may then be arranged either on opposite lateral sides of the rail if the rail friction surfaces 366 and 368 extend vertically, or respectively over and under the rail friction surfaces 366 and 368 if the rail friction surfaces 366 and 368 extend horizontally. In all such instances, the foot 370 of rail 208 is firmly secured to a fixed structure 372 with the vehicle being movable relative to the rail.

In other installations, the brake assemblies 200 could be mounted on a fixed part of a vehicle and the rail 208 could instead be a rotatable disc secured to a rotatable-wheel part of the vehicle.

As seen in FIG. 12, a brake assembly 200 of the type used in FIG. 11 may be adapted to engage a rod, shaft or cable 374. To accomplish this, the friction material support plate 376 and the friction material 378 are modified forms of the support plate 216 and the friction material 218. Instead of a flat surface, the friction material presents an arcuate surface 380 in mating relation to the friction brake engageable surface 382 of the rod or the like. The arcuate extent of the friction material surface 380 is no more than 180°, and is preferably at least one or two degrees of arc less so that the friction material may readily move into and out of braking engagement with the rod or the like 374. Of course, the operating faces of the pole pieces that extend through the friction material support plate 376 are also arcuately shaped to mate with a linearly extending part of the surface 382, and the part of the support plate 376 on which the friction material is secured is similarly arcuately shaped to provide full contact with the arcuate friction material.

Figure 13:
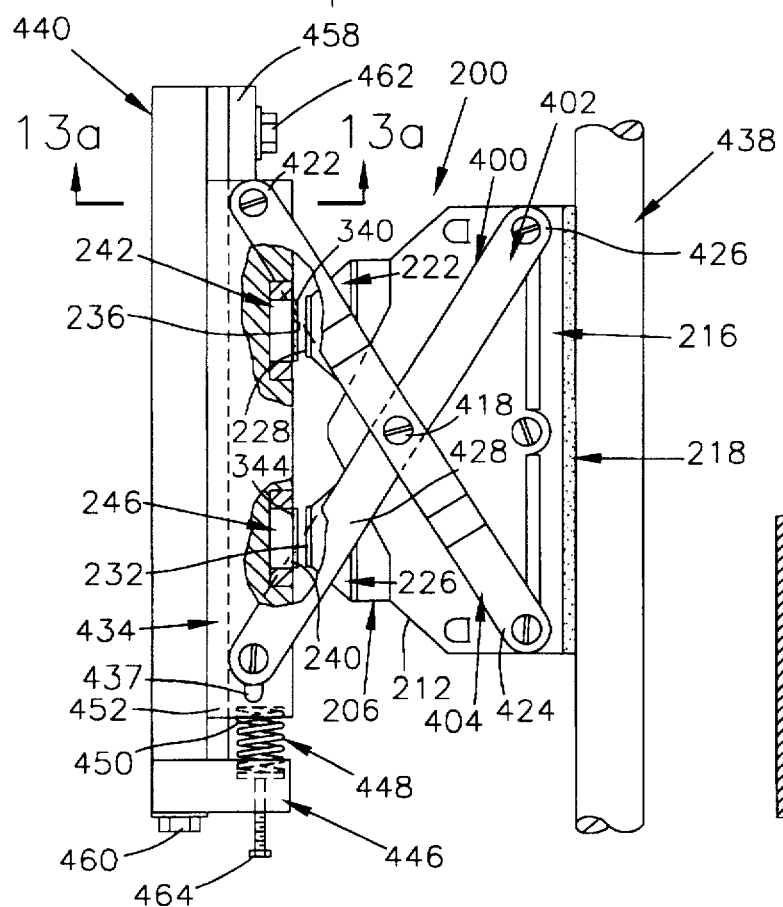
FIG. 13 shows a brake assembly which has a scissors-like mounting arrangement for the magnetic array assembly, and the magnetic backing plate assembly has limited linear movement which is parallel to the linear extending direction of the friction member. The fraction member is shown as a cylindrical bar as in FIG. 12, but may be a rail as shown in FIG. 2, for example.

FIG. 13 shows a brake assembly 200 having a magnetic array 206 similar to the magnetic arrays of FIGS. 2, 3, 4, 9, 11 and 12 guided in its brake releasing and brake engaging movements by a scissors mechanism 400. Since it is shown with two pole piece subassemblies rather than three, it is more like the magnetic array of FIG. 9. However, it may have three or more such pole piece assemblies.

Figure 14:
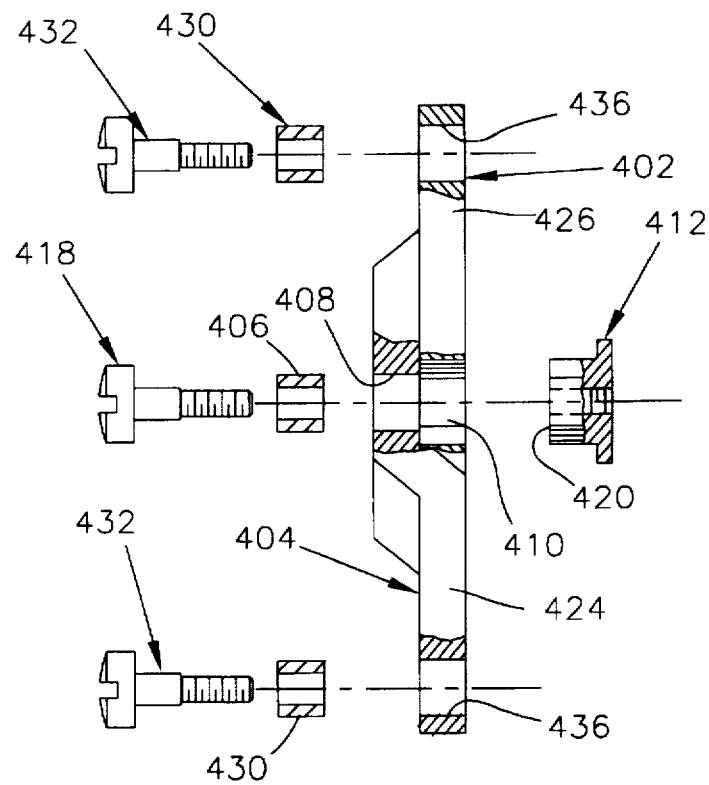
FIG. 14 is an exploded view of parts of the scissors mechanism used in FIG. 13.

The scissors mechanism 400 includes two arms 402 and 404, illustrated in further detail in FIG. 14, which are pivotally joined at their intermediate points by a suitable pivot securing arrangement such as a bushing or bearing 406 extending through aperture 408 in the arm 404, an internally threaded nut such as a T-slot nut 412 which has one end 414 fitting within a slot-like enlarged portion 416 of aperture 410 formed in arm 402 so that nut 412 cannot rotate relative to the arm 402 within that aperture, and an attaching bolt 418 which extends through the bushing or bearing 406 and is threaded into the nut 412. The bushing or bearing 406 fits within the aperture 408 and abuts the end 420 of the nut 412 so that arm 404 can pivot freely about the axis of bushing or bearing 406 relative to arm 402. The center part of arm 404 containing aperture 408 is bent out of the plane of the arm ends 422 and 424 so that those arm ends and the arm ends 426 and 428 of arm 402 are in substantially the same plane. As seen in FIG. 13, the straight arm 402 extends underneath the bent-out part of arm 404.

The outer ends 426 of arm 402 and 424 of arm 404 are pivotally secured to the friction material support plate 216, and the outer ends 428 of arm 402 and 422 of arm 404 are pivotally secured to the magnetic backing plate 434 by bushings 430 located in apertures 436 in the arms' outer ends and attaching bolts 432 which are threaded into appropriate threaded holes provided near each end of the magnetic backing plate 234. The outer end 428 of arm 404 is pivotally mounted to the magnetic backing plate 434 through an elongated closed-end slot 437 extending parallel to the friction braking rail, shown here as a rod 438. Of course, it may be in other forms noted herein, as well as their known equivalents in the art to which this invention pertains.

Figure 13A:
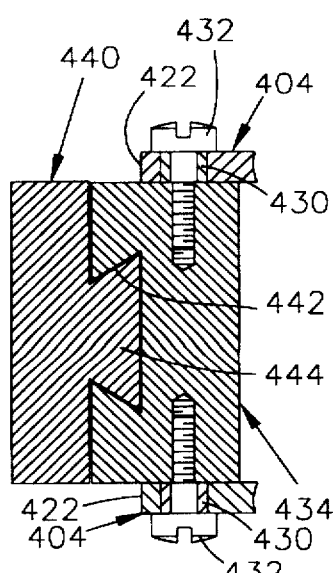
FIG. 13a is a fragmentary cross section view of a portion of the brake assembly of FIG. 13 taken in the direction of arrows 13a—13a of that FIGURE.

The magnetic backing plate 434 is slidably mounted by means of a dove-tail slide arrangement, shown in cross section in FIG. 13a, to a fixed slide member 440. Fixed slide member 440 is fixed to the vehicle, which may be an elevator cab by way of example. The trapezoidal cross section groove 442 in the magnetic backing plate 434 receives the trapezoidal cross section tongue 444 formed on the fixed slide member 440 in slidable mating relation. This keeps the backing plate 434 from moving laterally while permitting longitudinal sliding movements on member 440. One end of the dove-tail slide arrangement is shown as providing a spring seat and stop lug 446. A compression spring 448 has one end recessed in lug 446 and the other end 450 in engagement with the end 452 of backing plate 434. At rest, the spring 448 may exert little or no spring force on backing plate 434. However, when magnetic backing plate 434 is urged toward lug 446, spring 448 will absorb the sudden shock impact.

A stop 458 is removably provided at the end of the backing plate 434 near where arm end 424 is pivotally attached. Either it or lug 446 must be removed to be able to disassemble the dove-tail slide arrangement when needed. Capscrew 460 is provided to make lug 446 removable. Stop 458 is shown as being removably held in place by another cap screw 462 which extends through that stop and is threaded into a threaded recess in fixed slide member 440.

When braking is to be accomplished in both directions of movement of the vehicle being braked, the lug 446 and the stop 458 are required, since the stops transmit the braking force via the arms 402 and 404 and the magnetic backing plate 434 to the fixed part of the vehicle to which slide member 440 is attached. In an elevator in which descending movement is being braked, with the lug 446 being located higher than the backing plate 434, the lug 446 and its slide member 440 transmit the braking force from the backing plate 434 to the vehicle being braked.

The amount of movement of backing plate 434 toward lug 446 as it compresses spring 448 may be limited by the travel-limiting bolt 464, which may be threaded more or less into lug 446 so that it extends the desired extent, if any, beyond lug 446 and compresses the coils of spring 448.

Figure 15:
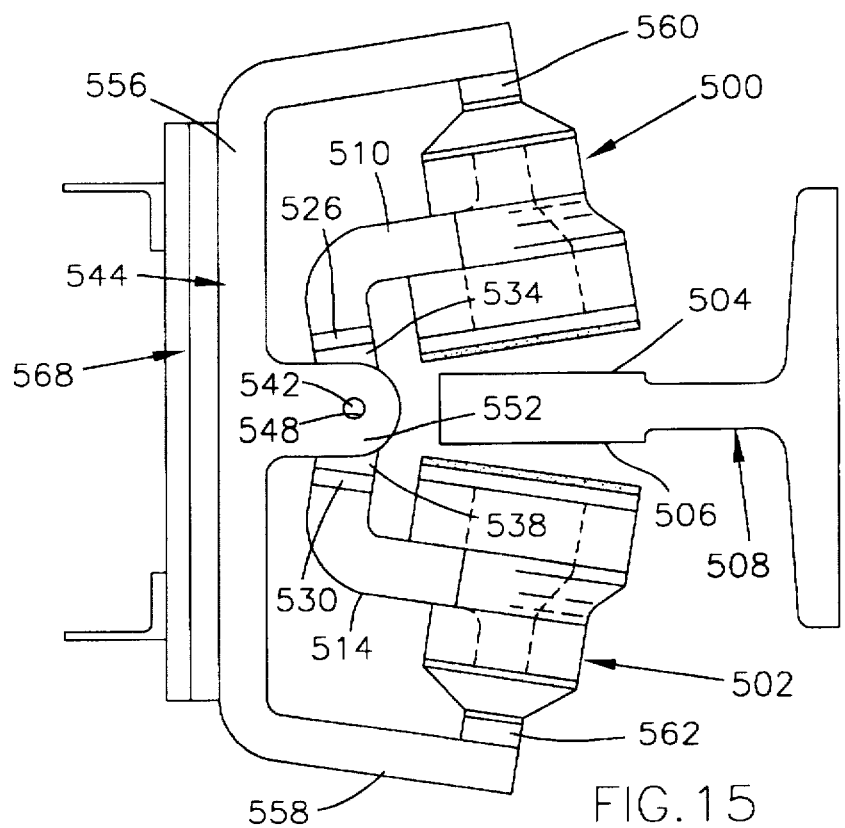
FIG. 15 is a view of another arrangement in which the magnetic array and the brake assembly of prior FIGURES may be mounted. In this arrangement, the assembly has a hinged magnetic array so that the brake mechanism friction faces are engageable with opposite sides of a rail. In this view, the brake mechanism is in its released position.
Figure 16:
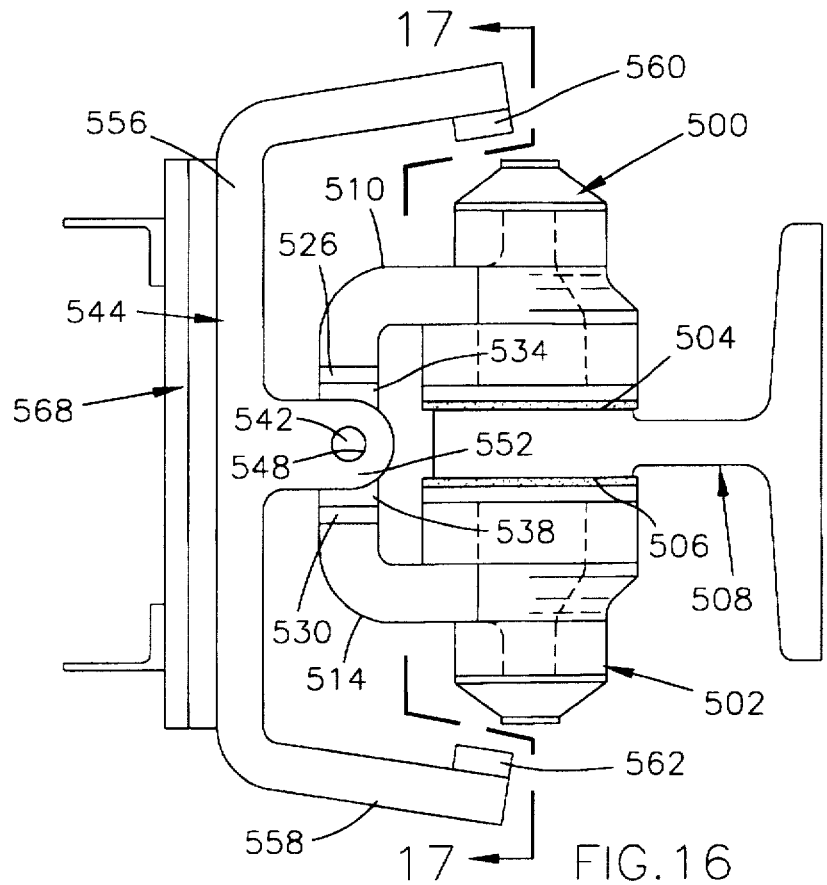
FIG. 16 is similar to FIG. 15, with the brake mechanism being shown in its brake-applied position.
Figure 17:
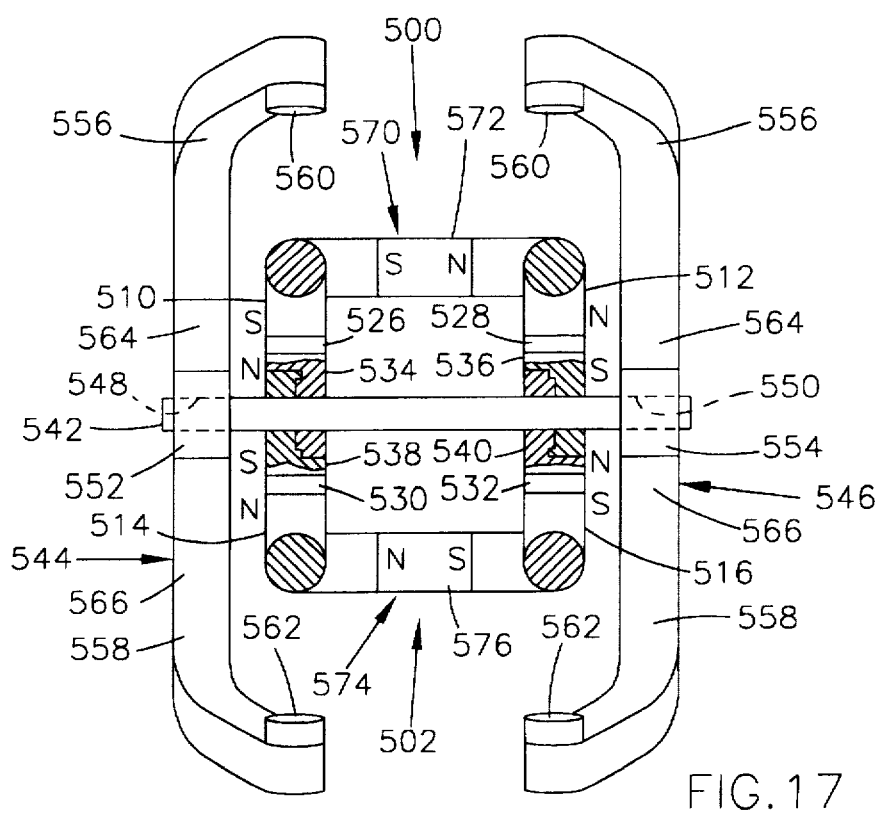
FIG. 17 is a view of the hinged brake mechanism of FIG. 16 taken in the direction of arrows 17—17 of that FIGURE.

FIGS. 15, 16 and 17 show a hinged arrangement for a pair of magnetic assemblies 500 and 502 which are pivoted away from the opposed friction surfaces 504 and 506 of a fixed rail 508 for brake release and are pivoted into braking engagement with those opposed rail frictions surfaces. As before, they are held into braking engagement with the rail surfaces by the forces of permanent magnet lines of flux, which flux lines are counteracted by energization of one or more electromagnets and magnetic lines of flux generated by the electromagnets attract the magnetic assemblies to their magnetic backing plates as previously described. Since the magnetic assemblies are constructed along the same functional lines as those earlier described, they need not again be described in detail.

As seen in FIGS. 15 and 16, and particularly in FIG. 17, the magnetic assemblies 500 and 502 respectively have pole piece parts 510, 512 and 514, 516 which extend outwardly from the assemblies until they clear the rail, and then extend in a direction which is parallel to the direction of pole piece extensions having the operating faces 518 and 520, and 522 and 524. Pole piece parts 510, 512 and 514, 516 are then respectively connected to permanent magnets 526, 528 and 530, 532, which are then respectively connected to two pairs of pole piece hinge parts 534, 536 and 538, 540. These hinge parts of each pair are overlapping with substantial surface-to-surface contact and are pivoted on a non-magnetic hinge pin 542 passing through axially aligned holes in both hinge parts. Because there are two sets of pole piece parts in each assembly 500 and in each assembly 502, those sets are joined together by cross bars 570 and 574 as seen in FIG. 17. Cross bar 570 has a permanent magnet 572 in it, and cross bar 574 has a permanent magnet 576 in it, in similar fashion as the earlier-described cross bars in other Figures. The North and South polarities of each of the six permanent magnets are indicated on the drawing of each magnet in FIG. 17 by the letters N and S, respectively.

Pin 542 is supported by a pair of generally E-shaped (as viewed in FIGS. 15 and 16) magnetic backing plates 544, 546, with pin 542 extending through axially aligned holes 548, 550 in the shorter middle arms 552 and 554 of the E configurations. The longer arms 556, 558 at the top and the bottom of each of the pair of E configurations each have a backing plate permanent magnet 560, 562 secured thereto. Only one pair of arms 556, 558 are shown in FIGS. 15 and 16, but FIG. 17 shows the middle arms 552 and 554 of both magnetic backing plate E-configured sections and the two pairs of arms 556, 558 spaced axially apart in relation to the axis of pin 542. These arms have their back portions 564, 566 of their E-shaped configurations secured to a fixed part 568 of the vehicle to be braked.

FIGS. 18, 19, 20, 21 and 22 show various features of the invention incorporated in a jacking/lifting arrangement that includes a mechanical brake force multiplier built into the brake assembly. FIGS. 18 through 21 show such a brake assembly 600 which includes a magnetic assembly 602 such as those found in FIGS. 2, 3 and 9. Reference is therefore made to the above descriptions of those FIGURES. Brake assembly 600 does not have the pin-and-bushing guide and support mechanisms of FIGS. 2 and 3, however. The magnetic assembly is provided with cam plates on each side of the magnetic assembly 602. Cam plate 604 is seen in FIGS. 18, 20, 21 and 22, but has been removed in FIG. 19 to provide an unobstructed view of the magnetic assembly 602. The cam plate on the other side of the magnetic assembly 602, which cannot be seen from the illustrated perspective of these Figures, is a reverse image of cam plate 604 and functions in the same manner as it does and also concurrently with it. Therefore, only one cam plate and other elements on one side of the magnetic assembly 602 need to be described in detail.

Figure 18:
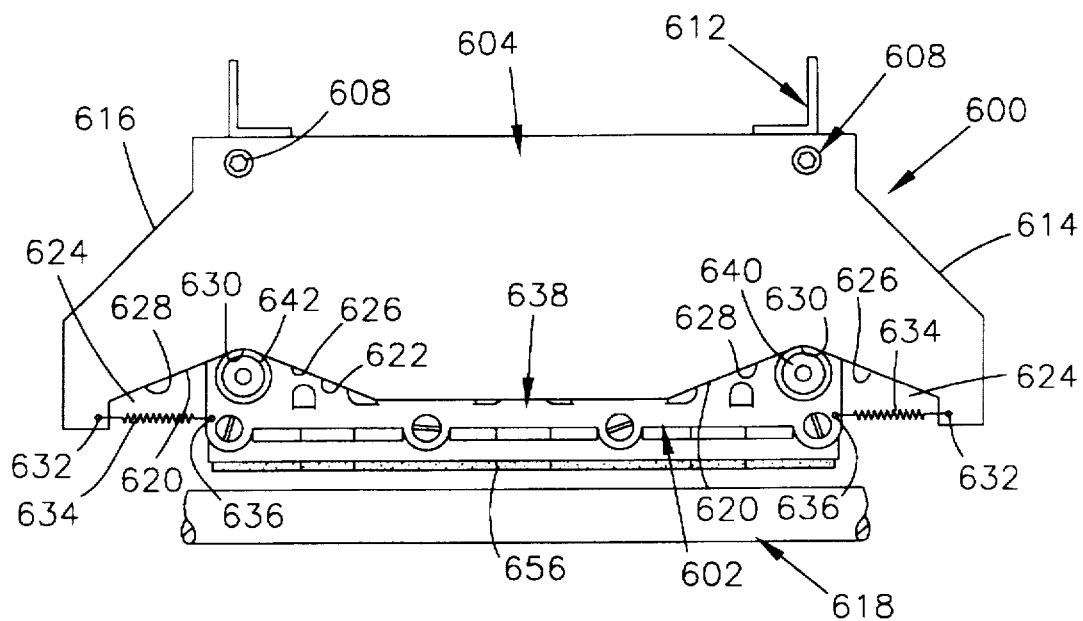
FIG. 18 is a plan view of another modification of the brake mechanism embodying the invention. It shows a mechanical brake apply force multiplier employing the reaction to the applied braking effort as the vehicle on which the brake magnetic array assembly is mounted acts through a roller camming arrangement to apply additional brake-applying force to the magnetic array assembly as it brakingly engages a rod or rail or the like. The brake mechanism is shown in the brake-released condition.
Figure 19:
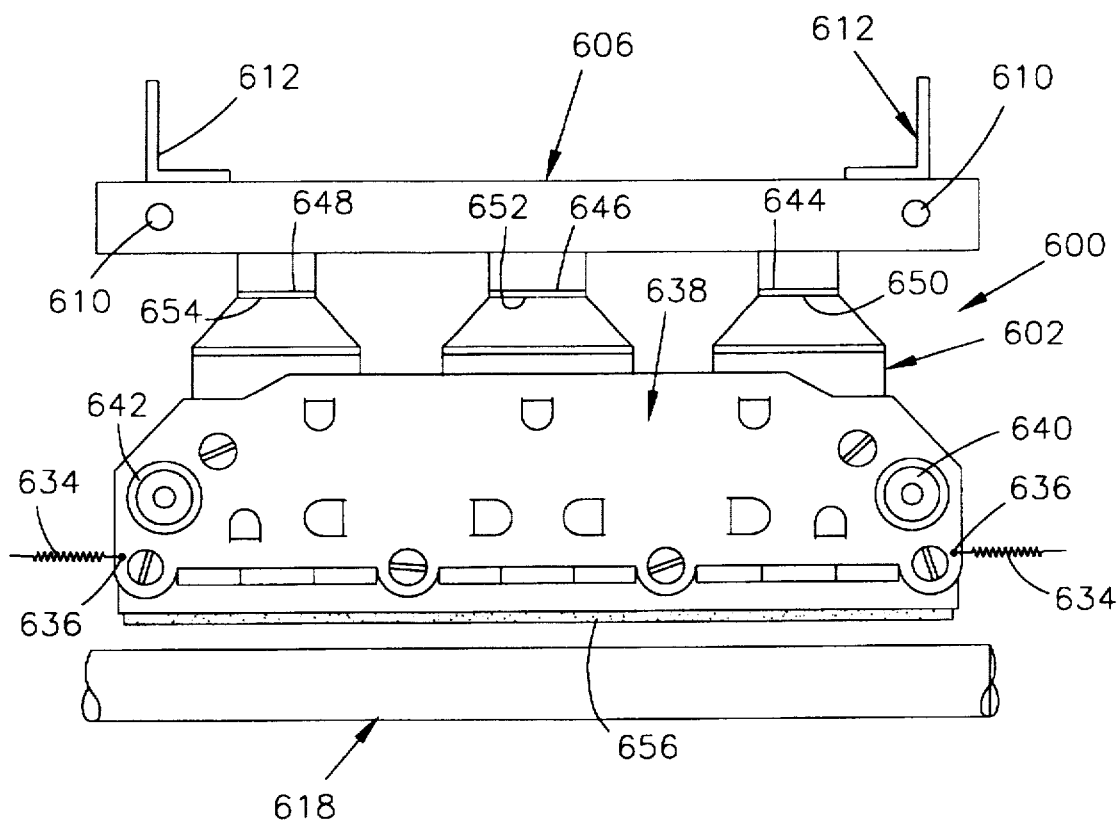
FIG. 19 is similar to FIG. 18, and has the cam plate removed so that other parts of the assembly are shown.

Cam plate 604 is attached to the magnetic backing plate assembly support plate 606 by screws 608, shown in FIG. 18, screws 608 being threaded into screw holes 610 provided in support plate 606, shown in FIG. 19. Support plate 606 is attached to a part 612 of the vehicle in which the brake assembly is installed. Cam plate 604 has arms 614 and 616 extending outwardly beyond the magnetic assembly 602 and toward the fixed linear guide assembly 618. As before, this guide assembly may take any of several forms earlier noted. In this instance, it is illustrated as a linearly extending rod, but may be a rail or other appropriate configuration. Respectively near arms 614 and 616 are cam surfaces 620 and 622 formed on the edge of the cam plate 604 facing the linear guide assembly. Each cam surface is formed by a shallow V-shaped recess opening 624 having sides 626 and 628 joined by a rounded apex 630. The outer end of each arm 614 and 616 has an opening 632 into which one end of a tension spring 634 is secured. This spring is a neutralization/return spring whose function will be later described. The other end of each spring 634 is secured through an opening 636 in the capture plate 638 immediately adjacent to the cam plate. It can be understood from this description that, since there are two cam plates 604 and two capture plates 638 for each brake assembly 600 with only one of each being in view in FIGS. 18, 20, 21 and 22, and only one capture plate 638 being in view in FIG. 19, there are actually four spaced-apart springs 634, with one spaced-apart pair on one end of the magnetic assembly 602 and another spaced-apart pair on the other end of the magnetic assembly 602. Openings 636 of capture plate 638 are laterally closer to the linear guide assembly 618 than are openings 632 of arms 614 and 616 so that the lateral components of spring forces from all four springs 634 continually urge the magnetic assembly 602 away from the linear guide assembly 618.

Also as seen in the drawing FIGS. 18 through 22, the two springs 634 attached to the two arms 614 exert other tension force components which act more nearly linearly on the magnetic assembly and which tend to move the magnetic assembly linearly upward, as seen in FIGS. 18 through 22. These tension linearly-acting force components are opposed by similar but oppositely linearly-acting tension force components exerted by springs 634 which are attached to the arms 616.

When the brake assembly is installed in the vertically extending position where arms 614 are the upper arms and arms 616 are the lower arms, as shown in the drawing FIGS. 18 through 22, the springs 634 attached to the upper arms 614 have sufficient additional tension forces so that they counteract the weight of the brake assembly as well as the tension forces exerted by the springs 634 attached to the lower arms 616, thus retaining the brake assembly in the lateral neutral position shown in FIG. 18. When the brake assembly is installed in a horizontally extending linear position, the springs 634 have like spring characteristics so that they exert opposing other tension force components on the magnetic assembly through the capture plates so that their tendencies to move the magnetic assembly 602 in one linear direction or the other are neutralized.

Roller assemblies 640 and 642 are round with a constant diameter throughout their circumferences. They are rotatably secured to the capture plate 638 so that they can engage the cam surfaces 620 and 622 in cam-following relation as will be described. When the magnetic assembly 602 is located in the linearly neutral position shown in FIG. 18 and the brake assembly is being held in the released position shown, the rollers of roller assemblies 640 and 642 are respectively received in cam-engaging relation in the rounded apexes 630 of cam surfaces 620 and 622, being urged there by the lateral spring force components of springs earlier described.

The operative engagement of the magnetic assembly operating faces 644, 646 and 648 with the respective magnetic backing plate assembly permanent magnet operating faces 650, 652 and 654 is shown in FIG. 19 and is the position of the magnetic assembly as shown in FIG. 18. This is the same type of brake released position as shown in earlier-described FIGS. 1, 2 and 15. The electromagnets of the magnetic assembly are energized to attain and maintain this brake released position.

Figure 20:
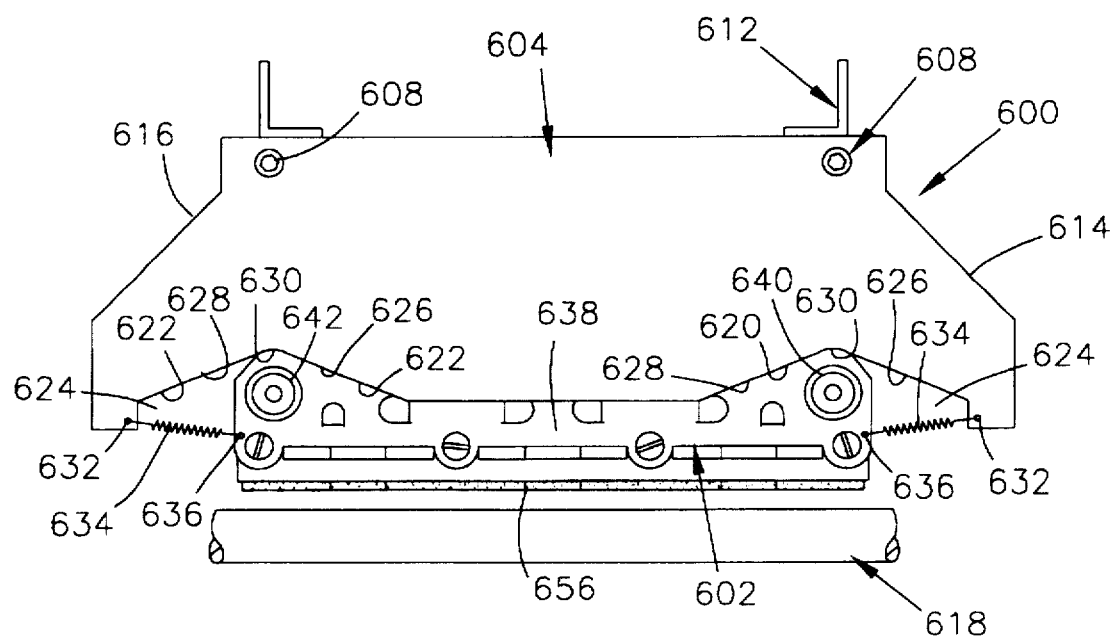
FIG. 20 is similar to FIG. 18, but shows the mechanism as it initiates the brake-applied position.

When the electromagnets of the magnetic assembly 602 are deenergized, as earlier described with reference to such magnetic assemblies, the brake assembly 600 assumes the initially-obtained brake applied position shown in FIG. 20. At this point, the friction material 656 becomes engaged with the linear guide assembly 618, but the vehicle in which the brake assembly 600 is installed is still moving. In FIGS. 18 through 22, this movement is downward in the typical elevator installation in which the brake assembly 600, and others like it, are activated because of excessive descending speed, as earlier described. At this point, all of the springs 634 have been further tensioned and their axis angles relative to the linear extending axis of the linear guide assembly 618 as well as that of the friction material 656 have changed to increase the lateral components of the spring forces exerted on the magnetic assembly. Also, the roller assemblies 640 and 642 have moved laterally directly out of the V-shaped rounded apexes 630 of recesses 624 and are not engaged with any of the cam side surfaces 626 and 628.

Figure 21:
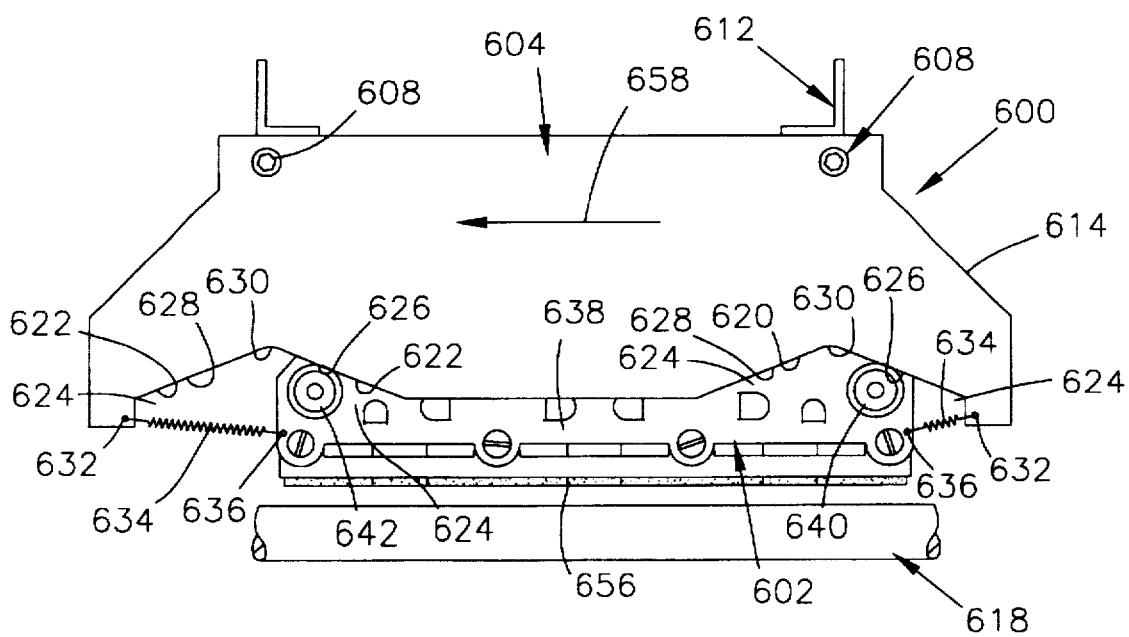
FIG. 21 is similar to FIG. 20, showing the action in which the roller camming arrangement is activated to apply additional brake actuating force to the magnetic array assembly, that force being generated mechanically.

As the vehicle continues to move downwardly, in the direction of arrow 658 of FIG. 21, the cam plate 604 moves with it while the magnetic assembly moves at a lesser speed because of its friction material frictional engagement with the linear guide assembly 618. The result is that the cam plate moves downwardly faster than does the magnetic assembly, including its roller assemblies 630 and 642, and the roller assemblies respectively engage the cam side surfaces 626 of the cam surfaces 620 and 622 in rolling engagement. So long as the vehicle, and with it the cam plate 604, is moving downwardly while the friction material 656 is brakingly engaged with the linear guide assembly 618, the camming action of the cam side surfaces 626 of cam surfaces 620 and 622 will generate additional brake-applying mechanical servo forces which increase the total brake-applying forces being exerted to obtain the braking action of the brake assembly, tending to stop the vehicle more quickly than it would stop because of the permanent magnet generated braking forces alone.

Once the vehicle descent is stopped, the cam plate 604 is no longer moving relative to the magnetic assembly, but the stationary weight of the vehicle being exerted downwardly -through the cam plate 604 will still provide some mechanical servo brake applied force. When the vehicle lift and descent mechanism is repaired, the electromagnets of the magnetic assembly are energized and the magnetic assembly friction material is moved out of engagement with the linear guide assembly and the brake assembly is returned to the release position shown in FIGS. 18 and 19. While it is within the purview of the invention that the electromagnet magnetic fields are sufficiently strong to accomplish this release against the force of the mechanical camming servo action, the vehicle may be lifted slightly once it is operative, thus easing the force requirements to move the magnetic assembly to the brake released position.

As can be envisioned in FIG. 21, if the arrow 658 indicating vehicle and cam plate movement is reversed, and the vehicle is moving upwardly at excessive speed so that the magnetic assembly electromagnets are deenergized, the same type of action will take place, but the roller assemblies will become rollingly engaged in camming relation with the camming side surfaces 628 and the camming action will then mechanically increase the brake applying force so as to increase the braking force obtained.

When the vehicle is moving horizontally along a linear guide assembly, as is the case with a train or tram by way of example, the same additional mechanical servo action will take place whether the vehicle is being braked while moving in a forward or a reverse condition.

One feature of the magnetic arrays having three (or more odd numbered) pole pieces is that the center pole piece should have larger cross section area operating faces than the faces of the adjacent pole pieces. This is shown in FIGS. 3, 4, 8, 11, and 19. For example, in FIGS. 3 and 4, the operating faces 230 and 256 of the center pole piece unit 293 has a larger diameter, and therefore a larger circular area, than the operating faces 228 and 254 of unit 291 or the operating faces 226 and 258 of unit 295. This is advantageous since the two adjacent units to the center unit, combined with the center unit itself, cause more magnetic flux to be passed through these operating faces than through their own operating faces, so larger operating faces on the center unit prevent those operating faces from becoming more saturated with magnetic flux than their adjacent units' operating faces.

FIG. 22 shows the installation of two brake assemblies 700 and 702 on opposite sides of a linear guide assembly such as rail 704. Brake assemblies 700 and 702 are illustrated as being essentially of the same construction and function as the brake assembly 600 of FIGS. 18 through 21. Therefore, the same reference characters will be used for these brake assemblies in FIG. 22 as are used in FIGS. 18–21 to identify the major parts of the brake assemblies. Reference should be made to the description relating to FIGS. 18–21 for detailed construction and operation, which will not be repeated here. Of course, other brake mechanisms such as others shown herein may be used as brake assemblies 700 and 702.

FIG. 22 schematically shows the addition of a load equalizer mechanism 706. This mechanism includes a pair of brake assemblies 708 and 710 which are shown as being essentially of the same construction and function as the brake assembly, including the scissors mechanism 400, of FIGS. 13 and 14. Reference should be made to the description relating to FIGS. 13–14 for detailed construction and operation, which will not be repeated here. Therefore, the same reference characters will be used for these brake assemblies in FIG. 22 as are used in FIGS. 13–14 to identify the major parts of the brake assemblies. Of course, other brake mechanisms such as others shown herein may be used as brake assemblies 708 and 710.

Brake assemblies 708 and 710 each have their arm ends 422 and 426 operatively attached to the friction material support plates 216, and arms, bars or rods 712 and 714 are likewise attached at the pivot points of the arm ends 422 and 426. Arms, bars or rods 712 and 714 extend parallel to each other and substantially parallel to the rail 704, with the extended ends 716 and 718 thereof being pivotally attached at 720 and 722, respectively, to the opposite ends of a cross bar 724. The center of cross bar 724 is pivotally attached at 726 to one end 728 of an adjustment mechanism 730. The other end 732 of adjustment mechanism 730 is pivotally attached at 734 to the center of another cross bar 736. Adjustment mechanism 730 is so constructed that its ends 728 and 732 can be moved toward or away from each other, shortening or lengthening the effective length between the pivot attachment points 726 and 734. It may be in the form of a left/right handed-threaded sleeve threaded to the stud-like ends 728 and 732 and provided with lock nuts. In turn, the opposite ends of cross bar 736 are respectively pivotally attached at 738 and 740 to the ends 742 and 744 of rods or bars 746 and 748. The other ends of rods 746 and 748 are respectively pivotally secured as 750 and 752 to the capture plates 638 of brake assemblies 700 and 702. Thus the linkage mechanism 754 of the equalizer mechanism 706 includes the arm ends 422 and 426; arms or rods 712 and 714; cross bars 724 and 736; rods or bars 712, 714, 746 and 748; and adjustment mechanism 730, as well as the various pivots at the arm ends and the cross bars and the ends of rods 746 and 748.

The equalizer mechanism allows some independent movements between the two brake assemblies 700 and 702, the two brake assemblies 708 and 710, allowing the various brake assemblies to act slightly independently of each other.

If, for example, when the brake assemblies are actuated and being applied in friction braking relation to the rail 704, and the rail is not precisely centered equally between the brake assemblies 700 and 702 or 708 and 710, one of the brake assemblies will engage the rail before the one opposite it. Any difference in engagement time, be it ever so slight, will result in the brake assemblies of each opposed pair clamping or latching in friction gripping relation to the rail at slightly different linear positions. The equalizing mechanism allows the transmission of linearly extending brake reaction forces from one pair of the brake assemblies to the other pair, allowing each of the opposed pair of brake assemblies to engage the rail at different positions and still maintain effective braking. Adjustment of the mechanism 730 allows the pairs of oppositely acting brake assemblies to be correctly positioned to compensate for the variations in structural assembly.

Assuming that the vehicle 612 is moving downwardly as seen in FIG. 22, and thus the cam plates 604 are moving at the same speed, while the linear guide assembly 704 is fixed, the entire load equalizer mechanism 706 is moving downwardly at the same speed as the vehicle and the brake assemblies 700 and 702. There is no friction braking contact of any of the friction materials 656 and 218 with the linear guide assembly 704.

Brake assemblies 700, 702, 708 and 710 are applied concurrently when signaled to be applied. This is done by deenergizing their electromagnets. When the brakes 700 and 702 are applied by deenergizing their electromagnets, their permanent magnets pull them into the friction braking position so that their friction materials 656 engage the linear guide assembly 704 in braking relation. Similarly, the friction materials 218 of brake assemblies 708 and 710 will engage the linear guide assembly 704 in braking relation.

So long as the brake assemblies 700 and 702 are generating exactly the same braking effort on the linear guide assembly 704, the brake magnetic assemblies 602 and their capture plates 638 move upwardly (as seen in FIG. 22) relative to the cam plates 604 to the same extent, and their cam roller assemblies 640 and 642 engage and roll on the cam surfaces 626, as described above, to the same extent, increasing their mechanical servo action to the same extent and still maintaining a braking force equilibrium between the two brake assemblies 700 and 702.

If one brake assembly, e.g., the brake assembly 702 on the right side of FIG. 22, has less total brake applying effort than the brake assembly 700 on the left side of FIG. 22, its magnetic assembly 602 combined with its mechanical servo action will exert less brake actuating force on the linear guide assembly 704 than does the same arrangement in the left-side brake assembly 700. Thus, the right side brake friction material 656 will exert less braking reaction force on its cam plates 604 through its capture plates 638, and therefore less brake reaction force will be transmitted in compression through rod 752 toward and to the equalizer bar 736 at pivot point 744 than the left side friction material 656 will be exerting in similar manner in compression through, toward and to the equalizer bar 736 at pivot point 742. This will cause the rod 750 to tend to move upwardly more than rod 752, exerting a greater force on one end 738 of the equalizer bar 736 at pivot point 742 than that exerted on the other end 740 of the equalizer bar 736 at point 744, tending to pivot the equalizer bar 736 clockwise as seen in FIG. 22, tending to move the magnetic assembly 602 and the capture plates 638, and therefore the rollers 640 and 642 of the right side brake assembly, downwardly as seen in FIG. 22, moving its roller assemblies 640 and 642 more into the V-shaped rounded recesses 630 of its cam plates 604. This is the position of the various elements of each of the brake assemblies 700 and 702 illustrated in FIG. 22.

At the same time, brake assemblies 706 and 710 are acting in braking relation on linear guide assembly 704 as above noted. Their braking forces are exerted through arms 712 and 714 to the equalizer bar 724, and those forces act through that bar on the adjustment mechanism 730, which in turn transmits forces to the equalizer bar 736. The forces are then transmitted to rod 750 to the capture plates 638 of the left-side brake 700, tending to move the roller assemblies 640 and 642 of brake 700 back into the cam surface apexes 630 of its cam plates 604. This tends to decrease the braking effort exerted by the friction material 656 of brake 700 on linear guide assembly 704. At the same time, the roller assemblies 640 and 642 of brake 702 are moved back into their cam surface rounded apexes 630, and are urged to roll on the cam surfaces 628, which increases the mechanically-induced braking forces for brake 702, thus bringing the brake forces of the two brakes 700 and 702 back into equilibrium, after which both of them apply equal braking forces to the linear guide assembly 704. Equalizer bar 736 is moved to be perpendicular to the axis of linear guide assembly 704, and thereafter the forces transmitted from the equalizer mechanism 706 through the adjustment mechanism 730 are equally transmitted to both rods 750 and 752 and therefore to all of the capture plates 638 of both brake assemblies 700 and 702. All of this equalizing adjustment process takes place extremely quickly so that the equalization of the braking forces is attained in a minimum amount of time with no substantial loss in braking effort during the equalizing adjustment process.

FIGS. 23 and 23a are schematic representations of a pole piece head 770, extending through friction material 772 so as to be engageable with and disengageable from a surface 774 of a rail 776, the center part of that rail in FIG. 23a being broken away so that pole piece head 770 and friction material 772 can be directly seen in that FIGURE. In this instance, the friction surface 774 of the rail 776 which is engageable by the head 770 and the friction material 772 is narrow in its lateral dimension as compared to the friction surfaces 366 and 368 of rail 208 of FIG. 11, and the friction surfaces 504 and 506 of rail 508 of FIGS. 15 and 16, for example. In order for there to be sufficient magnetic surface attraction with such narrow rail friction surfaces, the configuration of FIGS. 23 and 23a of the pole piece head and its surrounding friction material is desired. Pole piece head 770 has its surface which is engageable with the rail 776 formed in an elongated manner with its longer dimension extending in the direction of the rail 776. In this manner it may easily have at least as much head surface area as the circular heads shown in other FIGURES.

Figure 24:
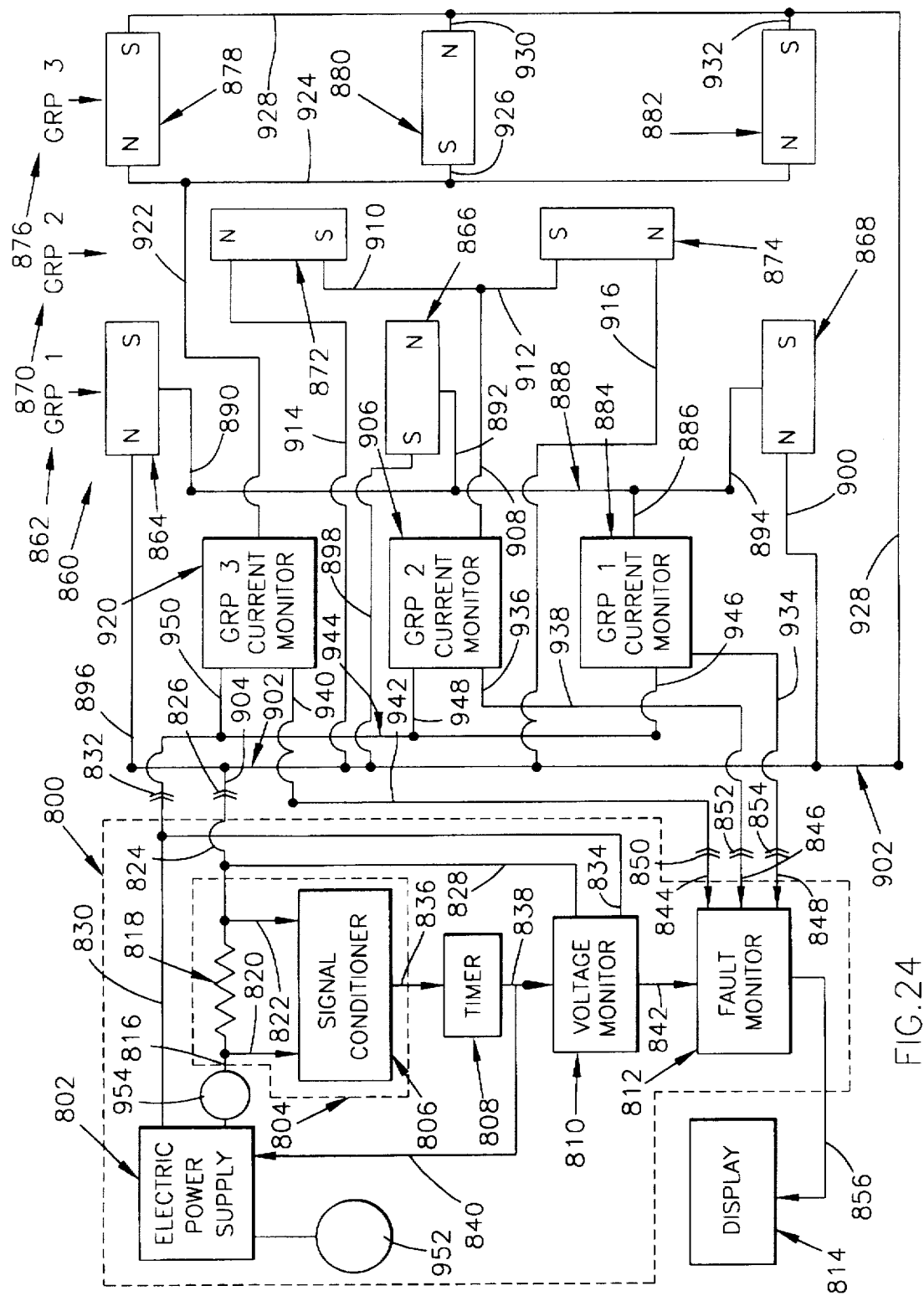
FIG. 24 is a simplified schematic representation of the electrical control unit for one of the brake assemblies disclosed in the earlier-described drawing figures, and one form of the electrical connections with the various electromagnets and related controls.

FIG. 24 is a schematic rendition of the electrical/electronic control unit (ECU) and the brake assemblies in a typical installation where several brake assemblies may be used and controlled. This arrangement is particularly advantageous when installed in an elevator or in a railway system such as a train or a tram. In such installations, it is more convenient to install several brake assemblies positioned in series along the rail or rails or other structures which are generically referrence to herein as linear guide assemblies. One such brake assembly is shown.

As shown in FIG. 24, the ECU 800 compromises a power supply 802; an in-rush detector 804 having a signal conditioner 806; a timer 808; a voltage monitor 810 and a fault monitor 812. A suitable display unit 814 is provided which may be located within or on the vehicle being controlled so as to provide information to the vehicle operator or, when the vehicle is self-operated, to any person having a need to have such information. The display unit may have within it a memory system which records the events over a preset period of time, and it can replay the events for diagnosis purposes. Thus the display unit thus functions to provide a real-time display of currently-effective information and to replay the recorded real-time information. This ability to replay is similar to security video cameras which record a view over a set period of time, and the views can be replayed; or to the "black boxes" installed in aircraft which record data for later analysis as needed.

In the ECU 800, the power supply 802 is connected by electrical lead 816 to the resistor 818 of the in-rush detector 804. Lead 816 is also connected by electrical lead 820 to the signal conditioner 806 of the in-rush detector 804. The other end of resistor 818 is connected by electrical lead 822 to the signal conditioner 806, and also by electrical lead 824 to a connector 826 to which an electrical lead, to be described, in the brake magnetic array is connected. Electrical lead 824 is also connected to the voltage monitor 810 by electrical lead 828. The power supply 802 is connected by an electrical lead 830 to another connector 832, and from electrical lead 830 to voltage monitor 810 by electrical lead 834. The signal conditioner 806 is connected by electrical lead 836 to timer 808. This timer is connected by electrical lead 838 to voltage monitor 810, and from lead 838 via electrical lead 840 to the power supply 802. Voltage monitor 810 is connected by electrical lead 842 to the fault monitor 812. Fault monitor 812 has three electrical leads 844, 846 and 848 respectively connecting it with connectors 850, 852 and 854; and another electrical lead 856 connecting it to the display unit 814.

The brake assembly 860 is shown as having a first group 862 of electromagnet windings 864, 866 and 868; a second group 870 of electromagnetic windings 872 and 874; and a third group 876 of electromagnetic windings 878, 880 and 882. Therefore, this particular brake assembly would have its magnetic array arranged in the manner disclosed either partially or fully in FIGS. 2–4, 8, 11–12, and 20–21. Those magnetic arrays are shown as having three electromagnetic windings about magnetically sensitive, but not permanently magnetized, pole pieces whose operating faces are engageable with the permanent magnets of the magnetic backing plate, two electromagnetic windings about the cross bar permanent magnets, and three electromagnetic windings about magnetically sensitive, but not permanently magnetized, pole pieces whose operating faces are engageable with the friction surface of a rail or other type of linear guide assembly. For simplicity, the magnetic array of FIG. 3 will be used below for showing equivalency to the schematic representation of the magnetic array of FIG. 24.

A current monitor 884 is connected by electrical lead 886 to a bus 888 which is respectively connected to one end of each of the electromagnet windings 864, 866 and 868 by electrical leads 890, 892 and 894 so that they are in parallel. The other ends of these electromagnet windings are respectively connected by electrical leads 896, 898 and 900 to electrical lead or bus 902, which is also connected by electrical lead 904 through connector 826 to the electrical lead 824 from the resistor 818 of the in-rush detector 804.

Another current monitor 906 is connected by electrical lead 908 through respective electrical leads 910 and 912 to the respective first ends of electromagnet windings 872 and 874 so that they are connected in parallel. The other ends of electromagnet windings 872 and 874 are respectively connected to electrical lead or bus 902 through electrical leads 914 and 916.

A third current monitor 920 is connected by electrical lead 922 to electrical lead 924 which is connected in turn to the ends of the electromagnet windings 878 and 882, and via electrical lead 926 to one end of electrical winding 880, so that these windings 878, 880 and 882 are in parallel. Current monitor 920 is therefore connected with the electromagnet windings collectively referred to as Group 3.

The Group 1 current monitor 884 is connected via electrical lead 934, connector 854 and electrical lead 848 to the fault monitor 812. The Group 2 current monitor 906 is connected via electrical lead 936, electrical lead 938, connector 852 and electrical lead 846 to the fault monitor 812. The Group 3 current monitor 920 is connected via electrical lead 940, electrical lead 942, connector 850 and electrical lead 844 to the fault monitor 812. Electrical lead 944 connects connector 832 with the Group 1 current monitor 884 via electrical lead 946, with the Group 2 current monitor 906 via electrical lead 948, and with the Group 3 current monitor 920 via electrical lead 950.

The power supply 802 supplies direct electrical current, either continuous (linear) or as a pulse width modulated current, to the system through electrical lead 830. While the supplied direct electrical current can be either a constant current or a constant voltage supply, it is preferred that it be a constant current supply since a constant voltage supply on any type of power supply that features fold-back shut-down or overvoltage/overcurrent detection should not be used in any application that is related to the safety or transport of people or hazardous cargo.

The use of a constant current supply allows a simple voltage monitor 810 to detect any change in voltage caused by the opening, energization or shorting of an electromagnet winding in any of the electromagnet Groups 1, 2 and 3. These Groups are respectively identified in FIG. 24 as 862, 870 and 876. A timer 808 that is activated by the inrush current of the electromagnets being energized allows a higher current/voltage acting to seat the magnetic array (of which the electromagnet windings of the windings Groups 862, 870 and 876 are parts) and hold it in its brake released condition. Once the magnetic array is seated on the magnetic backing plate permanent magnets, the power supplied to the magnetic array electromagnet windings may be reduced to a holding value. This reduction in power supplied to the electromagnet windings can reduce the effects of heating of the electromagnet windings as compared to the heating of them that would occur if they remained energized at full power.

Another advantage of using a constant current supply from power supply 802 is its ability to provide a constant magnetic flux density during temperature changes in the electromagnets of Groups 862, 870 and 876. As the windings in the electromagnets heat up while energized, the resistance of the windings change. The constant current supply will keep the ampere-turns constant, providing a constant flux density. In turn, this maintains a constant magnetic attraction at each magnetic array pole piece operating face. As the resistance of the windings increase, the constant current power supply raises the voltage of the supplied electrical current in order to provide a constant amperage passing through the electromagnet windings, keeping the ampere-turns of the electromagnet windings constant.

By providing the voltage monitor 810 with preset upper and lower voltage thresholds, it will be able to detect open and shorted electromagnet windings. Using multiple permanent magnets and electromagnets in two or more groups will permit a failure of an electromagnet without having the magnetic assembly inadvertently apply the brake.

Connecting the electromagnets in several groups, and while separately monitoring each group of electromagnets for their power consumption in relation to a known norm, will allow expanded fault-monitoring capability. In this preferred embodiment, the electromagnet windings of the first group are the magnetic backing plate operating face electromagnet windings 864, 866 and 868 which are respectively equivalent to the electromagnetic windings 278, 280 and 282 of FIG. 3, for example; the electromagnet windings of the second group are the permanent magnet electromagnet windings 872 and 874 which are respectively equivalent to the electromagnetic windings 276 and 274 of FIG. 3, for example; and the electromagnet windings of the third group are the linear guide assembly operating face electromagnet windings 878, 880 and 882 which are respectively equivalent to the electromagnetic windings 252, 250 and 248 of FIG. 3, for example.

Figure 25:
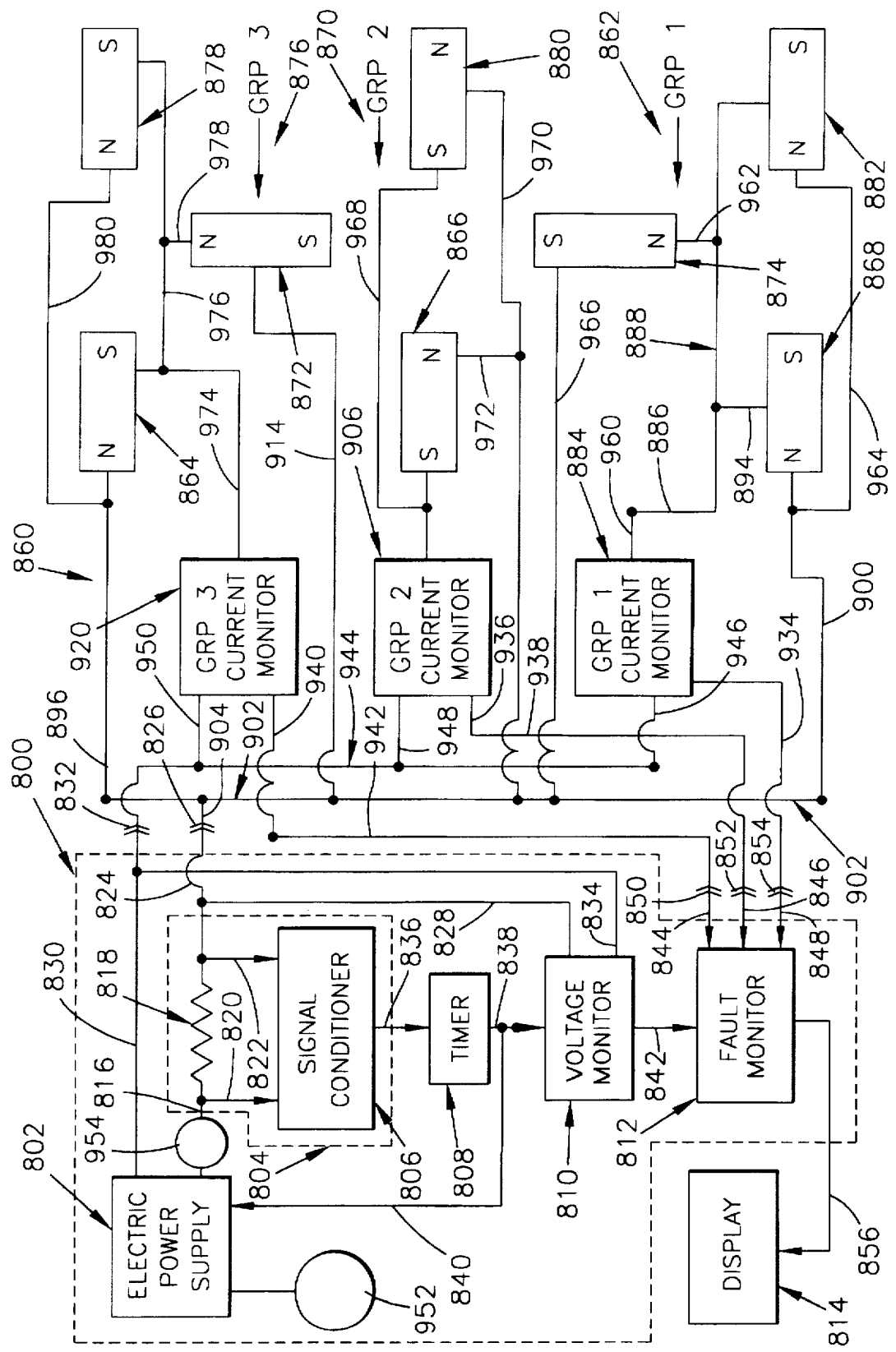
FIG. 25 is similar to FIG. 24, and shows another form of the electrical connections with the various electromagnets and related controls.

FIG. 25 is very similar to FIG. 24. All of the major components are the same. The difference is that different electromagnet windings are assigned to different Groups, and therefore are electrically connected in a different manner. In FIG. 24 the electromagnet windings contained in Group 1 were those associated with the brake magnetic backing plate side of the magnetic array, the electromagnet windings contained in Group 2 were those associated with the magnetic array cross bars and the permanent magnets therein, and the electromagnet windings contained in Group 3 were those associated with the linear guide assembly side of the magnetic array. Thus, in viewing the magnetic array, the Group 1 and Group 3 windings are basically in line parallel respectively to the magnetic backing plate and to the linear guide assembly, with the Group 2 windings being located in line parallel with the Group 1 and Group 3 windings and between those two Groups.

In FIG. 25, the three Groups are electrically connected so that the Group 1 electromagnet windings are those about a pole piece subassembly located on one end of the magnetic array and extending laterally perpendicular to the faces of the magnetic backing plate and the linear guide assembly and the electromagnetic winding on the cross bar joining with that pole piece subassembly and the center pole piece subassembly; Group 2 windings are only those windings about the center pole piece subassembly extending laterally perpendicular to the faces of the magnetic backing plate and the linear guide assembly and do not include any windings about a cross bar; and the Group 3 windings are those about the other pole piece subassembly located on the other end of the magnetic array and extending laterally perpendicular to the faces of the magnetic backing plate and the linear guide assembly and the electromagnetic winding on the cross bar joining with that other pole piece subassembly and the center pole piece subassembly.

In FIG. 25, the only reference characters that are changed from those in FIG. 24 are the various electrical leads which have meaningfully different connections necessitated by the change in orientation of the three Groups of electromagnet windings and therefore the windings that constitute each Group.

Thus, in Group 1, the current monitor 884 is connected to fault monitor 812 by electrical lead 934, connector 854 and electrical lead 848. Current monitor 884 is also connected by electrical lead 946 to electrical lead 944. Current monitor 884 is also connected through electrical lead 886 respectively through electrical lead 960 to one end of electromagnet winding 882, and through electrical lead 960 and 962 to one end of electromagnet winding 874. The other end of electromagnet winding 882 is connected through electrical lead 964 to electrical lead 900 and thence to electrical lead 902, with the remainder of the connection to the ECU 800 being the same as in FIG. 24. The other end of electromagnet winding 874 is connected to electrical lead 902 by electrical lead 966.

In Group 2, the current monitor 906 is connected to the fault monitor 812 via electrical lead 936, electrical lead 938, connector 852 and electrical lead 846. Current monitor 906 is also connected to electrical lead 944 by electrical lead 948. Current monitor 906 is also connected via electrical lead 908 and electrical lead 968 to one end of electromagnetic winding 880, and the other end of that winding is connected to electrical lead 902 via electrical lead 970. One end of electromagnet winding 866 remains connected to the current monitor 906 by electrical lead 908. However, the other end of that winding is now connected to electrical lead 902 via electrical lead 972, which is connected to electrical lead 970. As above noted, electrical lead 970 is connected to electrical lead 902.

In Group 3, current monitor 920 is connected to fault monitor 812 via electrical lead 940, electrical lead 942, connector 850 and electrical lead 844. Current monitor 920 is also connected to electrical lead 944 by electrical lead 950. Current monitor 920 is also connected via electrical lead 974 to an end of each of the three electrical windings 864, 872 and 876, with electrical lead 976 connecting electrical lead 974 to one end of electromagnet winding 876 and to electrical lead 978, which in turn is connected to one end of electrical winding 872. The other end of electrical winding 876 is now connected by electrical lead 980 to electrical lead 896, which is connected to electrical lead 902 as it is in FIG. 24. The other ends of electrical windings are connected to electrical lead 902 by the same leads as those in FIG. 24 are so connected.

There is a brake apply control 954 connected to control the electric power supply 802 in order to apply the brakes either under the control of a vehicle operator or in response to some abnormal condition such as the excessive speed descent of an elevator. Control 954 may be actuated by a suitable overspeed trip mechanism, for example, deactivating the power supply 802 which deenergizes the electromagnets, thus immediately applying the brake.

As noted earlier, there may be instances in which partial or modulated braking effort may be desirable. One such instance which can occur is after an elevator has been braked to a stop in response to a potential emergency such as overspeeding during descent. The elevator may be between floors of a building, and it would be desirable to let it controllably descend to the next or other lower floor to more easily service the elevator. In such an instance, it is desirable to provide suitable electrical power controls which will permit controlled application of electrical power to the various electromagnets, effectively decreasing the applied braking force just enough to let the elevator move gently downward, and then again removing the application of electrical power to the various electromagnets so as to again stop the elevator at the desired vertical location. Such a control 952 may, for example, be inserted in electrical lead of the electrical system of FIGS. 24 or 25 to control all electromagnets simultaneously. Alternatively, such a control may be inserted in each of electrical leads 946, 948 and 950 to control each group of electromagnets individually. Other locations for such controls could be, in FIG. 24, in electrical leads 886, 908 and 922; and in FIG. 25, in electrical leads 886, 908 and 974. It such controls are rheostats, for example, they would be first set for maximum resistance so that no substantial electrical power would pass therethrough, and thereafter, with the power supply available, be carefully adjusted for decreased resistance until the desired movement of the elevator is permitted. Once the desired elevator position is attained, the power supply would be disconnected and they would thereafter be set for zero resistance, which would be their normal setting during normal operations. After all repairs are completed and the elevator is again ready for normal service, the power supply would be reconnected, the electromagnets energized and the brake released. The elevator would then be under control of its hoisting equipment.

There are some advantages to each of the arrangements of FIGS. 24 and 25. For example, an electrical failure in any of the Group 1 or Group 2 elements of FIG. 24 will only increase the likelihood that the brake will be applied. in FIG. 25, an electrical failure in any one Group only lessens the effectiveness of that Group, but the other two Groups continue to provide the same brake functions, just at a lesser level.

I claim:

1. A vehicle brake having a brake released condition wherein the vehicle is movable and a brake applied condition wherein the vehicle is being braked against vehicle movement; said vehicle brake comprising:

a magnetic latch mechanism having a magnetic array containing at least one permanent magnet and at least one selectively energized and deenergized electromagnet and first and second oppositely-extending operating faces with friction material through which said first operating face extends to cooperatively provide a friction braking surface in a common plane therewith, said magnetic latch mechanism having alternately existing first and second latched conditions, said first latched condition being a staple latched condition existing with said at least one electromagnet deenergized and being coexistent with said brake applied condition, and said second latched condition existing with said at least one electromagnet energized and being coexistent with said brake released condition, said second latched condition having only limited stability in that it depends upon the continuous energization of said at least one electromagnet, said magnetic latch mechanism further comprising:

a first member, said at least one permanent magnet and at least one electromagnet being part of said magnetic array, said magnetic array forming a part of said first member;

a second member fixed to a portion of the vehicle and having said first member operatively mounted thereon in limited movable relation relative to said fixed member, said second member having a magnetically-sensitive magnetic backing plate secured thereto;

a magnetically-sensitive third member with which said first and second members have relative movement, said third member having at least one friction braking surface which is selectively braked and unbraked by engagement and disengagement of said magnetic latch mechanism magnetic array friction braking surface with said third member at least one friction braking surface;

said first stable latched condition of said mechanism having said magnetic array magnetically latched in braking relation to said third member by the magnetic force caused by the magnetic flux of said at least one permanent magnet with said at least one electromagnet being deenergized, establishing and maintaining said brake applied condition wherein said magnetic array friction braking surface is in braking engagement with said third member at least one friction braking surface;

and said second latched condition of said mechanism having said at least one electromagnet electrically energized and producing electromagnetic flux creating electromagnetic force acting between said at least one electromagnet and said second member to move said magnetic array from its first latched condition in which it was latched in braking relation to said third member to its second latched condition in which it is latched to said second member, establishing and maintaining said brake released condition for so long as said at least one electromagnet remains energized.

2. The vehicle brake of claim 1 in which the vehicle being braked is linearly movable and said third member is a linearly-extending brake-engageable member alongside which the vehicle being braked is selectively moved and braked against such movements.

3. The vehicle brake of claim 2 in which the vehicle being braked is an elevator which is selectively vertically movable and braked against such vertical movements by the braking action of said vehicle brake.

4. The vehicle brake of claim 3 in which said magnetically-sensitive third member is a rail having said at least one friction braking surface engaged in friction braking relation whenever said at least one electromagnet is deenergized.

5. The vehicle brake of claim 2 in which said magnetically-sensitive third member is a rail having said at least one friction braking surface engaged in friction braking relation whenever said at least one electromagnet is deenergized.

6. The vehicle brake of claim 3 in which said magnetically-sensitive third member is a rod having said at least one friction braking surface engaged in friction braking relation whenever said at least one electromagnet is deenergized.

7. The vehicle brake of claim 3 in which said magnetically-sensitive third member is a cable having said at least one friction braking surface engaged in friction braking relation whenever said at least one electromagnet is deenergized.

8. The vehicle brake of claim 2 in which said vehicle brake has a plurality of said magnetic latch mechanisms installed on the vehicle to be braked in linearly spaced relation for selective braking engagement with said linearly-extending brake-engageable member.

9. The vehicle brake of claim 2 in which said vehicle brake further comprises a mechanical servo arrangement having cams having ramped cam surfaces mounted on said second member and cam roller followers engageable with said cam ramped cam surfaces upon the application of braking force in response to the magnetic force of said at least one permanent magnet to mechanically apply additional braking force to said magnetic array and increase the effective braking force acting on said third member during braking.

10. The vehicle brake of claim 1 in which said magnetic array has a plurality of spaced guide rods and said second member has a mating plurality of spaced guide bushings receiving said guide rods therethrough and guiding and limiting the movements of said magnetic array and its first and second operating faces to limited transverse movements in relation to said second member and said third member.

11. The vehicle brake of claim 1 in which said magnetic array has a pair of guide arms which are pivotally secured together at central parts thereof in scissors-like fashion;

said guide arms including first and second sets of arm ends with said first set of arm ends extending generally toward said second member being pivotally secured to a linearly slidable part of said second member, said linearly slidable part having limited slidable movement in relation to the remainder of said second member and having one of said first set of arm ends pivotally secured in a slot formed in said second member linearly slidable part for limited linear movements permitting scissors-like movements of said pair of guide arms;

said second set of guide arm ends being pivotally secured to said magnetic array a spaced points which are linearly aligned in parallel with said second member linearly slidable part;

said guide arms guiding all transverse movements of said magnetic array in relation to said second and third members.

12. The vehicle brake of claim 1 in which two magnetic latch mechanisms are provided, one being located for braking engagement with a friction braking surface one side of said third member and the other being located for braking engagement with a friction braking surface on an opposite side of said third member.

13. The vehicle brake of claim 12 in which said two magnetic latch mechanisms are interconnected by a hinge pivotally located on said second member so that said magnetic latch mechanisms have their respective first operating faces moving arcuately and transversely toward and away from said third member friction braking surfaces during brake apply and brake release.

14. A vehicle brake in which a first pair of brake mechanisms being of the type set forth in claim 9 are mounted on opposite sides of said third member for braking engagement with said third member opposite sides; and a second pair of the brake mechanisms set forth in claim 11 are likewise mounted on opposite sides of said third member for braking engagement with said third member opposite sides, said second pair of brake mechanisms being mounted linearly adjacent to said first pair of brake mechanisms;

and a brake equalizing linkage connecting said first pair and said second pair of brake mechanisms and acting by forces generated by the braking action of said second pair of brake mechanisms to equalize the braking effort of each of said first pair of brake mechanisms during brake application.

15. The vehicle brake of claim 1 in which said magnetic array at least one electromagnet has a pole piece on one end of which is provided with an circumferentially enlarged section one side of which is abutted by one end of the winding of said at least one electromagnet and the other side of which surrounds the one of said magnetic array operating faces extending toward said second member magnetic backing plate, that one magnetic array operating face being of substantially less cross section area that the maximum cross section area of said circumferentially enlarged section, said circumferentially enlarged section acting to concentrate the magnetic flux of said winding through said one of said magnetic array operating faces extending toward said second member magnetic backing plate when said at least one electromagnet is energized to oppose the magnetic flux of said at least one permanent magnet, and acting to diffuse any residual magnetic flux in said electromagnet winding and pole piece which remains as a part of the electromagnetically generated magnetic flux after the electromagnet is deenergized.

16. The vehicle brake of claim 15 in which said circumferentially enlarged section has a truncated cone configuration with the larger base thereof forming the side thereof abutted by said electromagnet winding.

17. The vehicle brake of claim 1 in which said second of said oppositely-extending operating faces are in alignment with operating faces of an equal number of permanent magnets mounted on said magnetic backing plate and operatively engage said equal number of permanent magnets in magnetic latching relation while the brake is in its brake released condition.

18. The vehicle brake of claim 17 in which a thin amount of elastomeric shock-absorbing material is attached to a selected one of said second of said oppositely-extending operating faces and said permanent magnet operating faces, said material acting to absorb the mechanical shocks occurring when said magnetic array is moved to operatively engage said second of said oppositely extending operating faces with said permanent magnet operating faces.

19. The vehicle brake of claim 1 in which said third member is a linearly extending rail having a short vertical height so that said at least one friction braking surface is transversely narrow, limiting the amount of transverse width of each of said magnetic array first operating faces and said friction material;
   each of said magnetic array first operating faces having a linearly long dimension and a transversely short dimension providing sufficient operating face operating area for substantially unrestricted transmittal of magnetic flux therethrough to the same extent as if said operating face operating area would have been circular and of a substantially larger diameter if said rail at least one friction braking surface had been sufficiently wide to accommodate such a circular operating face operating area.

20. The vehicle brake of claim 1 in which said at least one selectively energized and deenergized electromagnet has a wire winding about a pole piece forming the armature of said electromagnet, said wire winding being generally annular and toroidally formed to provide a circular opening about the axis of said pole piece through which said pole piece extends with one end of said winding being in a plane substantially perpendicular to the axis of said pole piece and also being eccentrically shaped so that the widths of opposed sides along the major axis of that eccentric shape are different, the ratio of those widths being greater than 1:1 and as much as 4:1 and more, and the axially extending thicknesses of those opposed sides being in the reverse order less than 1:1 as much as 1:4 and more, said other end of said winding being in a plane at an acute angle to said pole piece axis with that angle being controlled primarily by the ratio of said axially extending thicknesses of said opposed sides.

21. The vehicle brake of claim 1 in which said at least one selectively energized and deenergized electromagnet has a wire winding wound about a pole piece with multiple loops forming the armature of said electromagnet, said wire winding being elliptically formed about said pole piece to provide along the major axis thereof one winding side having a first ellipse major axis width and a first thickness between the opposite ends of said winding, and the opposite winding side having a second major axis width along the ellipse major axis and a second thickness between the opposite ends of said winding, said first width being substantially wider than said second width by a ratio range on the order of 1.25:1 and greater, and said first thickness being substantially less than said second thickness by a ratio on the order of less than 0.75:1 and less.

22. The vehicle brake of claim 1 in which said elliptically formed winding has, as seen in cross section, a first number of layers of wire loops with a first number of loops in each layer in said one winding side along said major axis of said elliptically formed winding, a second number of layers of wire loops with a second number of loops in each layer in said opposite winding side along said major axis of said elliptically formed winding, said first and second numbers of layers of wire loops being inversely proportional to said first and second numbers loops in each layer.

23. The vehicle brake of claim 1 further comprising a control circuit having means controlling the presence or absence, and when present, the strength and direction of the effective magnetic flux of said magnetic array caused by said at least one electromagnet.

24. The vehicle brake of claim 23, said control circuit having means sensing an adverse condition of the vehicle in which said brake is installed while said brake is in said second latched condition, said sensing means generating a signal which operatively deenergizes said at least one electromagnet upon the occurrence of said vehicle adverse condition so that said brake is changed to said first latched condition.

25. The vehicle brake of claim 23, said controlling means having a modulatable brake releasing control which is separate from said sensing means and which, with said brake in said first latched condition, is selectively operative to act under manual control to energize said at least one electromagnet sufficiently to decrease the effective brake apply force while maintaining the brake applied condition so as to controllably permit vehicle movement at a slow speed and then being selectively operative to again deenergize said at least one electromagnet and fully reestablish said first latched condition of said brake with the vehicle located at a desired position.

26. The vehicle brake of claim 25 in which the vehicle is an elevator and said first latched condition has resulted in the location of the elevator between floors so as to have at least very limited access to the interior thereof, and said brake releasing control, upon its controlled energization of said at least one electromagnet permits the elevator to descend to be moved slowly until it is at a floor where access to the interior thereof is available.

27. The vehicle brake of claim 1 in which said magnetic array comprises a plurality of permanent magnets and a plurality of an odd number of at least three pole pieces positioned in linearly spaced relation and extending transversely to the direction of such linear spacing, said pole pieces being armatures for a plurality of said electromagnets and having operating faces on opposite ends thereof for selectively engaging and disengaging said second and third members in magnetic latching relation, said permanent magnets and said pole pieces and said electromagnets defining a magnetic matrix which is a part of said magnetic array and which has magnetic flux characteristics in accordance with the polar arrangement and interrelated physical positioning of said permanent magnets and said plurality of electromagnets and the energization and deenergization of said plurality of electromagnets, and the center one of said odd numbered pole pieces having its operating faces of sufficiently larger areas than the operating faces of each one of the pole pieces next adjacent thereto, the magnetic flux then flowing through an operating face of said center one of said odd numbered pole pieces which is engaged with one of said second and third members being in an unsaturated flux flow condition comparable to the magnetic flux flow through said operating faces of each one of the pole pieces next adjacent thereto while.

28. The vehicle brake of claim 27 in which the area of each operating face of said center one of said odd numbered pole pieces is at least equal to the combined areas of the two immediately adjacent operating faces of the pole pieces next adjacent thereto, said magnetic flux flow therethrough then being at no greater flux concentration than the flux concentration of the magnetic flux flow through each of said immediately adjacent operating faces.

29. The vehicle brake of claim 26 in which said brake control system includes:
   an electronic information processing and brake control unit including an electrical power supply receiving signals from said sensing means and generating electrical power signals selectively delivered to said magnetic latch mechanism and actuating and releasing said brake in accordance with the presence and absence of electrical power;
   said magnetic array including a plurality of groups of said electromagnets, each of said groups having a current monitor between said electrical power supply and said electromagnets in each group, each of said current monitors sensing any change in current flow in its group and generating a signal responsive thereto;
   a fault monitor;
   said signals from said current monitors being sent to and received by said fault monitor;
   and a display unit indicating the group having the current monitor generating the signal indicating a change in the current flow in its group.

30. The vehicle brake of claim 29 in which one of said groups of electromagnets includes all electromagnets about pole piece ends having operating faces operatively engageable with and disengageable from said second member;
   another one of said groups of electromagnets includes all electromagnets which are wound about armatures which are any of said at least one permanent magnet;
   and another one of said groups of electromagnets includes all electromagnets about pole piece ends having operating faces operatively engageable with and disengageable from said third member.

31. The vehicle brake of claim 29 in which a first one of said groups of electromagnets includes all electromagnets about one pole piece having operating faces operatively selectively engageable with and disengageable from said second member and other operating faces operatively selectively engageable with and disengageable from said third member, and an electromagnet having a permanent magnet connected to said one pole piece;
   a second one of said groups of electromagnets includes all electromagnets about another pole piece having operating faces operatively selectively engageable with and disengageable from said second member and other operating faces operatively selectively engageable with and disengageable from said third member, and an electromagnet having a permanent magnet connected to said other pole piece;
   and a third one of said groups of electromagnets includes all electromagnets about yet another pole piece positioned between said one and said other pole pieces and having operating faces operatively selectively engageable with and disengageable from said second member and other operating faces operatively selectively engageable with and disengageable from said third member.

32. The method of selectively and alternatively magnetically latching and unlatching a first member to and from a second member and magnetically unlatching and latching the first member to a third member, said method comprising the steps of:
   (1) providing a magnetic-flux-conductive part of the second member;
   (2) establishing a permanent magnetic flux within a part of the third member;
   (3) magnetically latching the first member to the third member by only the permanent magnetic flux within a part of the first member;
   (4) selectively establishing an electromagnetic magnetic flux within a part of the first member which when established is in magnetic flux interactive relation with the permanent magnetic flux, the electromagnetic flux when established being of predetermined magnetic polar orientations;
   (5) the electromagnetic magnetic flux, when having the predetermined magnetic polar orientations established, modifying the effect of the permanent magnetic flux so the net effective magnetic flux magnetically decreases the magnetic attraction of the first member to the third member;
   (6) then further modifying the effect of the permanent magnetic flux by the electromagnetic flux so the net effective magnetic flux is such that the magnetic attraction of the first member to the third member is eliminated, causing the first member to be magnetically unlatched from the third member, and moving the first member into magnetic latching engagement with said second member;
   (7) then maintaining sufficient electromagnetic flux within the part of the first member to keep the first member magnetically latched to the second member;
   (8) generating a signal in response to a requirement that the first member be magnetically unlatched from the second member and be magnetically latched to the third member;
   (9) and disestablishing the electromagnetic flux and reestablishing the permanent magnetic flux as the only active magnetic flux and moving the first member by magnetic force generated only by the permanent magnetic flux into magnetic latching engagement with the third member and completing a magnetic flux circuit for the permanent magnetic flux through the magnetic-flux-conductive part of the third member and the part of the first member in which the permanent magnetic flux is established.

33. The method of selectively and alternatively magnetically latching and unlatching a first member to and from braking relation with a second member and magnetically unlatching and latching the first member to and from braking relation with a third member, and controllably decreasing the magnetic latching of the first member to the third member thereby decreasing the braking relation between the first member and the third member, said method comprising the steps of:
   (1) providing a magnetic-flux-conductive part of the second member;
   (2) establishing a permanent magnetic flux within a part of the third member;
   (3) magnetically latching the first member to the third member by only the permanent magnetic flux within a part of the first member;
   (4) selectively establishing an electromagnetic flux within a part of the first member which has two modes of establishment, one of which is by full energization of electromagnets in the first member causing immediate unlatching of the first member with the third member and movement of the first member into magnetic latching engagement with the second member, and the other of which is by incremental energization of electromagnets in the first member, decreasing the magnetic latching of the first member with the third member only until the braking action between the first and third members is such that braking still occurs but movement between the first and the third members which was totally braked is controlled in small increments until the first member reaches a desired position with respect to the third member; and (5) when the second mode of establishment is practiced, deenergizing the electromagnets and again fully establishing the braking relation between the first and third members, repeating step (3);

(6) and when the first mode of establishment is practiced, (7) selectively establishing an electromagnetic magnetic flux within a part of the first member which when established is in magnetic flux interactive relation with the permanent magnetic flux, the electromagnetic flux when established being of predetermined magnetic polar orientations;

(8) the electromagnetic magnetic flux, when having the predetermined magnetic polar orientations established, modifying the effect of the permanent magnetic flux so the net effective magnetic flux magnetically decreases the magnetic attraction of the first member to the third member;

(9) then further modifying the effect of the permanent magnetic flux by the electromagnetic flux so the net effective magnetic flux is such that the magnetic attraction of the first member to the third member is eliminated, causing the first member to be magnetically unlatched from the third member, and moving the first member into magnetic latching engagement with said second member;

(10) then maintaining sufficient electromagnetic flux within the part of the first member to keep the first member magnetically latched to the second member;

(11) generating a signal in response to a requirement that the first member be magnetically unlatched from the second member and be magnetically latched to the third member;

(12) and disestablishing the electromagnetic flux and reestablishing the permanent magnetic flux as the only active magnetic flux and moving the first member by magnetic force generated only by the permanent magnetic flux into magnetic latching engagement with the third member and completing a magnetic flux circuit for the permanent magnetic flux through the magnetic-flux-conductive part of the third member and the part of the first member in which the permanent magnetic flux is established.

* * * * *